United States Patent
Sugie et al.

(10) Patent No.: US 10,312,513 B2
(45) Date of Patent: Jun. 4, 2019

(54) LITHIUM COMPOSITE METALLIC OXIDE AND PRODUCTION PROCESS FOR THE SAME

(71) Applicant: KABUSHIKI KAISHA TOYOTA JIDOSHOKKI, Kariya-shi, Aichi (JP)

(72) Inventors: Tsukasa Sugie, Kariya (JP); Dai Matsushiro, Kariya (JP); Masanori Harata, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 143 days.

(21) Appl. No.: 15/309,859

(22) PCT Filed: Apr. 7, 2015

(86) PCT No.: PCT/JP2015/001969
§ 371 (c)(1),
(2) Date: Nov. 9, 2016

(87) PCT Pub. No.: WO2015/174009
PCT Pub. Date: Nov. 19, 2015

(65) Prior Publication Data
US 2017/0149060 A1    May 25, 2017

(30) Foreign Application Priority Data
May 13, 2014  (JP) ................. 2014-099169

(51) Int. Cl.
*H01M 4/525*  (2010.01)
*C01G 53/00*  (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC .. H01M 4/525; H01M 10/0525; H01M 4/505; C01G 53/50; C01P 2004/84; C01P 2004/04; C01P 2002/85; C01P 2006/40
See application file for complete search history.

(56) References Cited

U.S. PATENT DOCUMENTS 6,730,435 B1    5/2004  Nakane et al.
7,622,222 B2   11/2009  Chiga et al.
(Continued)

FOREIGN PATENT DOCUMENTS

JP    2001-196063 A    7/2001
JP    2003-007299 A    1/2003
(Continued)

OTHER PUBLICATIONS

International Search Report of PCT/JP2015/001969 dated Jun. 30, 2015 [PCT/ISA210].

*Primary Examiner* — Peter F Godenschwager
*Assistant Examiner* — Andrew J. Oyer
(74) *Attorney, Agent, or Firm* — Sughrue Mion, PLLC

(57) ABSTRACT

A lithium composite metallic oxide expressed by: $Li_aNi_b\text{-}Co_cMn_dD_eO_f$ (where $0.2\leq\text{"a"}\leq1.5$, "b"+"c"+"d"+"e"=1, $0<\text{"e"}<1$, "D" is at least one of the following elements: Fe, Cr, Cu, Zn, Ca, Mg, Zr, S, Si, Na, K, Al, Ti, P, Ga, Ge, V, Mo, Nb, W, La, Hf and Rf, and $1.7\leq\text{"f"}\leq2.1$), and including: a high manganese portion, which is made of a metallic oxide including Ni, Co and Mn at least and of which the composition ratio between Ni, Co and Mn is expressed by Ni:Co:Mn=g:h:i (note that "g"+"h"+"i"=1, $0<\text{"g"}<1$, $0<\text{"h"}<\text{"c"}$, and $\text{"d"}<\text{"i"}<1$), in a superficial layer thereof; and a metallic oxidation portion in an outermost superficial layer of the high manganese portion.

5 Claims, 10 Drawing Sheets

(51) Int. Cl.
*H01M 10/0525* (2010.01)
*H01M 4/505* (2010.01)

(52) U.S. Cl.
CPC ..... *H01M 10/0525* (2013.01); *C01P 2002/85* (2013.01); *C01P 2004/04* (2013.01); *C01P 2004/84* (2013.01); *C01P 2006/40* (2013.01); *Y02T 10/7011* (2013.01)

(56) References Cited

U.S. PATENT DOCUMENTS

| | | |
|---|---|---|
| 2003/0082448 A1 | 5/2003 | Cho et al. |
| 2006/0093911 A1 | 5/2006 | Chiga et al. |
| 2008/0138708 A1 | 6/2008 | Watanabe et al. |
| 2009/0068561 A1* | 3/2009 | Sun ............ H01M 4/131 429/223 |
| 2013/0202966 A1 | 8/2013 | Yu et al. |
| 2014/0027670 A1 | 1/2014 | Sun et al. |
| 2014/0154555 A1 | 6/2014 | Endoh et al. |
| 2015/0357641 A1 | 12/2015 | Sugie et al. |

FOREIGN PATENT DOCUMENTS

| | | |
|---|---|---|
| JP | 2006-127932 A | 5/2006 |
| JP | 2007-048711 A | 2/2007 |
| JP | 2008-135279 A | 6/2008 |
| JP | 2013-517599 A | 5/2013 |
| JP | 2014-505334 A | 2/2014 |
| JP | 2014-112476 A | 6/2014 |
| JP | 2015-082428 A | 4/2015 |
| WO | 2011/087309 A2 | 7/2011 |
| WO | 2012/093797 A2 | 7/2012 |
| WO | 2014/115559 A1 | 7/2014 |

* cited by examiner

LITHIUM COMPOSITE METALLIC OXIDE AND PRODUCTION PROCESS FOR THE SAME

CROSS REFERENCE TO RELATED APPLICATIONS

This application is a National Stage of International Application No. PCT/JP2015/001969, filed Apr. 7, 2015, claiming priority based on Japanese Patent Application No. 2014-099169, filed May 13, 2014, the contents of all of which are incorporated herein by reference in their entirety.

TECHNICAL FIELD

The present invention relates to a lithium composite metallic oxide, and a production process for the same.

BACKGROUND ART

Various materials have been known to be used for active materials in nonaqueous-system secondary batteries. Among the materials, lithium composite metallic oxides, which have a lamellar rock-salt structure and are expressed by a general formula, $Li_a Ni_b Co_c Mn_d D_e O_f$ (where $0.2 \leq "a" \leq 1.5$, $"b"+"c"+"d"+"e"=1$, $0 \leq "e" < 1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7 \leq "f" \leq 2.1$), have been used universally as active materials for lithium-ion secondary batteries.

However, when a lithium composite metallic oxide expressed by the aforementioned general formula is used as an active material in a high-capacity secondary battery driven or operated with a high voltage required for on-vehicle secondary battery, for instance, the lithium composite metallic oxide has been unable to keep the standard for satisfying a capacity maintained rate of the secondary battery, because the resistance of the material to the high voltage has been insufficient.

Consequently, investigations have been actively carried out recently to upgrade various materials to be used as active materials in the resistance to high voltage. In making the investigations, the following three methods have been proposed commonly.
1) doping an active material with an element of different species
2) forming a protective film on the surface of an active material
3) changing the composition of an active material in the superficial layer The method according to above-mentioned 1), and an advantageous effect thereof are concretely explained below. Doping an active material with an element, such as Al or Zr, which has not been present in the active material, enables degradations of the active material accompanied by charging and discharging operations, namely, accompanied by the absorption and release of Li, to be inhibitable.

The method according to above-mentioned 2), and an advantageous effect thereof are concretely explained below. As following Patent Application Publication No. 1 discloses, making a protective film on the surface of an active material with a salt of phosphoric acid, and preventing the active material from contacting directly with an electrolytic solution enable degradations of the active material resulting primarily from contacting with the electrolytic solution to be inhibitable.

The method according to above-mentioned 3) is concretely explained below. Following Patent Application Publication No. 2 discloses an active material with an increased Al composition in an obtainable superficial layer thereof by coating the active material on the surface with an Al compound and then heat treating the active material with the Al compound coated thereon.

Since the three methods according to aforementioned 1) through 3) have drawbacks given below, respectively, the methods have not necessarily arrived at obtaining a satisfiable active material yet.

The following are the drawbacks of the method according to aforementioned 1): Since absorbable and releasable Li in the active material has been decreased, in effect, by doping the active material with the different-species element not being driven or operated electrochemically, the Li storage capacity in the active material decreases and thereby the capacity of a lithium-ion secondary battery, per se, declines.

A drawback of the method according to aforementioned 2) is that the protective film formed on the surface of the active material turns into an electric resistance to make currents less likely to flow. Although making the protective film into an extremely-thin film is good to overcome the drawback, establishing such a technology is very difficult at the level of industrialization.

The method according to aforementioned 3) is desirable theoretically, because the method does not likely to cause a capacity to decline, the drawback of the method according to aforementioned 1), and because any electrically-resistive protective film, the drawback of the method according to aforementioned 2), is not formed at all. However, according to the disclosures of Patent Application Publication No. 2, since the method according to aforementioned 3) is virtually a technology of doping the active-material superficial layer with Al, not only the same drawbacks as 1) are observed, but also no marked advantageous effect is observed when comparing the active material of which the Al composition in the active-material superficial layer is increased by the treatment method set forth in the publication with another active material to which the treatment is not carried out at all.

That is, in the technologies of modifying the active materials, an active material fully satisfying the standard is not necessarily said to be obtainable.

Hence, the present inventors reported a novel lithium composite metallic oxide obtainable by a new surface modification method in Patent Application Publication No. 3.

PATENT LITERATURE

Patent Application Publication No. 1: Japanese Unexamined Patent Publication (KOKAI) Gazette No. 2006-127932;
Patent Application Publication No. 2: Japanese Unexamined Patent Publication (KOKAI) Gazette No. 2001-196063; and
Patent Application Publication No. 3: PCT/JP2014/000361

SUMMARY OF THE INVENTION

Technical Problem

As mentioned above, new lithium composite metallic oxides adoptable as active materials have been provided one after another.

The present invention is made in view of such circumstances. An object of the present invention is to provide a new lithium composite metallic oxide usable as an active material which keeps a satisfactory Li storage capacity, namely, which exhibits a satisfactory capacity maintained rate, even when being employed for secondary batteries driven or operated with a high voltage.

Solution to Problem

As a result of earnest investigations by the present inventors, the present inventors discovered that, among the lithium composite metallic oxides disclosed in Patent Application Publication No. 3, materials, which are expressed by a general formula, $Li_aNi_bCo_cMn_dD_eO_f$ (where $0.2 \leq \text{"a"} \leq 1.5$, "b"+"c"+"d"+"e"=1, $0 < \text{"e"} < 1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7 \leq \text{"f"} \leq 2.1$), and to which a doping element "D" is indispensable, show especially superior durability.

According to further studies by the present inventors, the present inventors discovered that the above-mentioned materials comprise: a high manganese portion, which is made of a metallic oxide including Ni, Co and Mn at least and of which the composition ratio between Ni, Co and Mn is expressed by Ni:Co:Mn=g:h:i (note that "g"+"h"+"i"=1, $0 < \text{"g"} < 1$, $0 < \text{"h"} < \text{"c"}$, and $\text{"d"} < \text{"i"} < 1$), in a superficial layer thereof; and a metallic oxidation portion in an outermost superficial layer of the high manganese portion. Then, the present inventors completed the present invention.

That is, a lithium composite metallic oxide according to the present invention is expressed by a general formula, $Li_aNi_bCo_cMn_dD_eO_f$ (where $0.2 \leq \text{"a"} \leq 1.5$, "b"+"c"+"d"+"e"=1, $0 < \text{"e"} < 1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf, and Rf, and $1.7 \leq \text{"f"} \leq 2.1$); and comprises:
 a high manganese portion, which is made of a metallic oxide including Ni, Co and Mn at least and of which the composition ratio between Ni, Co and Mn is expressed by Ni:Co:Mn=g:h:i (note that "g"+"h"+"i"=1, $0 < \text{"g"} < 1$, $0 < \text{"h"} < \text{"c"}$, and $\text{"d"} < \text{"i"} < 1$), in a superficial layer thereof; and
 a metallic oxidation portion in an outermost superficial layer of the high manganese portion.

Advantageous Effects of the Invention

The present lithium composite metallic oxide keeps a satisfactory Li storage capacity, namely, exhibits a satisfactory capacity maintained rate, even when being employed for a secondary battery driven or operated with a high voltage.

DESCRIPTION OF THE EMBODIMENTS

Figure 1:
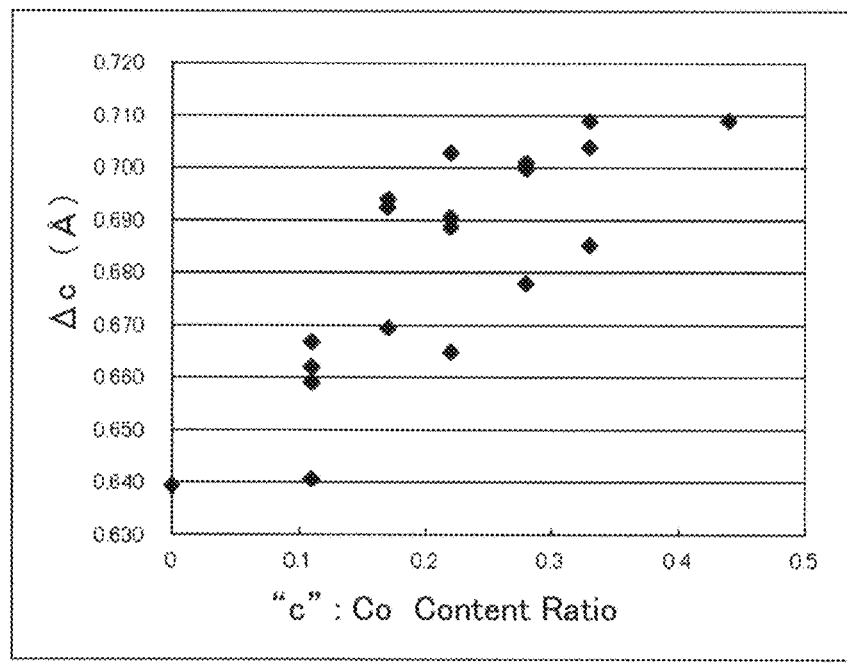
FIG. 1 is a scatter diagram showing the relationships between Co content ratio "c" and Δc which concern results given in Table 1.

Some of best modes for executing the present invention are hereinafter described. Note that, unless otherwise specified, numerical ranges, namely, "from 'x' to 'y'" set forth in the present description, involve the lower limit, "x," and the upper limit, "y" in the ranges. Moreover, the other numerical ranges are composable by arbitrarily combining any two of the upper-limit values and lower-limit values, involving the other numeric values enumerated in examples as well. In addition, selecting numeric values arbitrarily from within the ranges of numeric values enables other upper-limit and lower-limit numerical values to be set.

A lithium composite metallic oxide according to the present invention is expressed by a general formula, $Li_aNi_bCo_cMn_dD_eO_f$ (where $0.2 \leq \text{"a"} \leq 1.5$, "b"+"c"+"d"+"e"=1, $0 < \text{"e"} < 1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf, and Rf, and $1.7 \leq \text{"f"} \leq 2.1$), and comprises:
 a high manganese portion, which is made of a metallic oxide including Ni, Co and Mn at least and of which the composition ratio between Ni, Co and Mn is expressed by Ni:Co:Mn=g:h:i (note that "g"+"h"+"i"=1, $0 < \text{"g"} < 1$, $0 < \text{"h"} < \text{"c"}$, and $\text{"d"} < \text{"i"} < 1$), in a superficial layer thereof; and a metallic oxidation portion in an outermost superficial layer of the high manganese portion.

The present lithium composite metallic oxide is expressed by the general formula for lamellar rock-salt structure, $Li_aNi_bCo_cMn_dD_eO_f$ (where $0.2\leq"a"\leq1.5$, $"b"+"c"+"d"+"e"=1$, $0<"e"<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf, and Rf, and $1.7\leq"f"\leq2.1$). As for preferable "b," "c" and "d," the following are given: $0<"b"<1$; $0<"c"<1$; and $0<"d"<1$. More preferable "b," "c" and "d" falls within the following ranges, respectively: $0<"b"<80/100$; $0<"c"<70/100$; and $10/100<"d"<1$. Falling in the following ranges is much more preferable: $10/100<"b"<70/100$; $12/100<"c"<60/100$; and $20/100<"d"<70/100$. Falling in the following ranges is especially preferable: $25/100<"b"<60/100$; $15/100<"c"<50/100$; and $25/100<"d"<60/100$.

As to "a," "e" and "f," numerical values falling within the ranges which the general formula prescribes are allowable. The following are exemplifiable as being preferable: $0.5\leq"a"\leq1.3$; $0<"e"<0.2$; and $1.8\leq"f"\leq2.1$. Moreover, the following are exemplifiable as being more preferable: $0.8\leq"a"\leq1.2$; $0<"e"<0.1$; and $1.9\leq"f"\leq2.05$.

"D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf. Preferable "D" is at least one element selected from the group consisting of Zr, Si, Al, Ti, Ga, Ge, V, Nb, La, Hf and Rf. More preferable "D" is at least one element selected from the group consisting of Zr, Si, Ti, Ge, Hf and Rf. Much more preferable "D" is at least one element selected from the group consisting of Zr, Ti, Hf and Rf.

Of the present lithium composite metallic oxide, a section other than the high manganese portion and metallic oxidation portion (hereinafter, referred to sometimes as a "core portion") is also allowed to be a section with a single composition, but is even permitted to be constituted of sections with multiple compositions. For example, the core portion is also allowed to be made up of the following: a first-composition portion expressed by a general formula, $Li_{a1}Ni_{b1}Co_{c1}Mn_{d1}D_{e1}O_{f1}$ (where $0.2\leq"a1"\leq1.5$, $"b1"+"c1"+"d1"+"e1"=1$, $0<"e1"<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7\leq"f1"\leq2.1$); and a second-composition portion expressed by a general formula, $Li_{a2}Ni_{b2}Co_{c2}Mn_{d2}D_{e2}O_{f2}$ (where $0.2\leq"a2"\leq1.5$, $"b2"+"c2"+"d2"+"e2"=1$, $0<"e2"<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7\leq"f2"\leq2.1$ (note that at least any of the following is satisfied: $"c2"<"c1"$; or $"d2">"d1"$)).

When the core portion is constituted of the first-composition portion and second-composition portion, each of the first-composition portion and second-composition portion is also allowed to be localized, but is even permitted to be nonlocalized. Moreover, the first-composition portion and second-composition portion are also allowed to form an active-material primary particle serving as a single crystalline structural body. Note herein that the term, a "single crystalline structural body" refers to bodies in which crystal structures exhibited by the first-composition portion and second-composition portion are virtually identical with one another; in which the crystal structures further neighbor one another continuously while the two take an identical crystal orientation virtually; and in which the two show such a state as if the two form a single crystal, although the compositions are different from one another partially. The core portion is a combined body in which the active-material primary particles as well as the first-composition portion and/or second-composition portion other than the active-material primary particles are combined with each other in large numbers. Although a configuration of the active-material primary particles is not at all limited especially, the active-material primary particles with flat configurations are observed abundantly. When an active material according to the present invention is observed by a microscope, a major-diameter length of the active-material primary particles falls within a range of from 100 to 1,200 nm roughly, and a minor-diameter length of the active-material primary particles falls within a range of from 100 to 500 nm roughly. Note that the term, a "major-diameter length of the active-material primary particles" signifies a length of the longest site or location in the active-material primary particles at the time of observing the active-material primary particles. Moreover, in the active-material primary particles at the time of the observation, a "minor-diameter length of the active-material primary particles" signifies a length of the other longest site or location in one of directions crossing at right angles to the major diameter of the active-material primary particles.

In the general formula, $Li_{a1}Ni_{b1}Co_{c1}Mn_{d1}D_{e1}O_{f1}$ (where $0.2\leq"a1"\leq1.5$, $"b1"+"c1"+"d1"+"e1"=1$, $0<"e1"<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7\leq"f1"\leq2.1$), directed to the first-composition portion, the values of "b1," "c1" and "d1" are not at all restricted especially, as far as the values satisfy the aforementioned conditions. However, allowable values of "b1", "c1" and "d1" fall in such ranges as $0<"b1"<1$, $0<"c1"<1$, and $0<"d1"<1$, respectively. Moreover, at least any one of "b1," "c1" and "d1" falls preferably in such a range as $10/100<"b1"<90/100$, $10/100<"c1"<90/100$, and $5/100<"d1"<70/100$, respectively; more preferably falls in such a range as $12/100<"b1"<80/100$, $12/100<"c1"<80/100$, and $10/100<"d1"<60/100$, respectively; and much more preferably falls in such a range as $15/100<"b1"<70/100$, $15/100<"c1"<70/100$, and $12/100<"d1"<50/100$, respectively.

As to "a1," "e1" and "f1," numerical values falling within the ranges which the general formula prescribes are allowable. The following are exemplifiable as being preferable: $0.5\leq"a1"\leq1.3$; $0<"e1"<0.2$; and $1.8\leq"f1"\leq2.1$. Moreover, the following are exemplifiable as being more preferable: $0.8\leq"a1"\leq1.2$; $0<"e1"<0.1$; and $1.9\leq"f1"\leq2.05$.

In the general formula, $Li_{a2}Ni_{b2}Co_{c2}Mn_{d2}D_{e2}O_{f2}$ (where $0.2\leq"a2"\leq1.5$, $"b2"+"c2"+"d2"+"e2"=1$, $0<"e2"<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7\leq"f2"\leq2.1$ (note that at least any of the following is satisfied: $"c2"<"c1"$; or $"d2">"d1"$)), directed to the second-composition portion, the values of "b2", "c2" and "d2" are not at all restricted especially, as far as the values satisfy the aforementioned conditions. However, allowable values of "b2", "c2" and "d2" fall in such ranges as $0<"b2"<1$, $0<"c2"<"c1"$, and $"d1"<"d2"<1$, respectively; or permissible values thereof satisfy both of the following: $"c2"<"c1"$ and $"d2">"d1"$." Moreover, at least any one of "b2," "c2" and "d2" falls preferably in such a range as $0<"b2"<"b1,"$ $0<"c2"<"c1,"$ and $"d1"<"d2"<1$, respectively; more preferably falls in such a range as $10/100<"b2"<"b1,"$ $10/100<"c2"<"c1,"$ and $"d1"<"d2"<90/100$, respectively; much more preferably falls in such a range as $10/100<"b2"<90/100$, 10/100<"c2"<{"c1"−(5/100)}, and {"d1"+(5/100)}<"d2"<90/100, respectively; and especially preferably falls in such a range as 12/100<"b2"<80/100, 10/100<"c2"<{"c1"−(10/100)}, and {"d1"+(10/100)}<"d2"<90/100, respectively.

As to "a2," "e2" and "f2," numerical values falling within the ranges which the general formula prescribes are allowable. The following are exemplifiable as being preferable: 0.5≤"a2"≤1.3; 0<"e2"<0.2; and 1.8≤"f2"≤2.1. Moreover, the following are exemplifiable as being more preferable: 0.8≤"a2"≤1.2; 0<"e2"<0.1; and 1.9≤"f2"≤2.05.

A mass ratio between the first-composition portion and the second-composition portion in the core portion is allowed to fall within a range of from 1:10 to 10:1. The following are exemplifiable as being preferable ranges: from 1:5 to 5:1; from 1:3 to 3:1; from 2:5 to 5:2; from 1:2 to 2:1; from 3:5 to 5:3; from 7:10 to 10:7; and from 4:5 to 5:4. The mass ratio is especially preferred to fall within a range of from 9:10 to 10:9.

Figure 2:
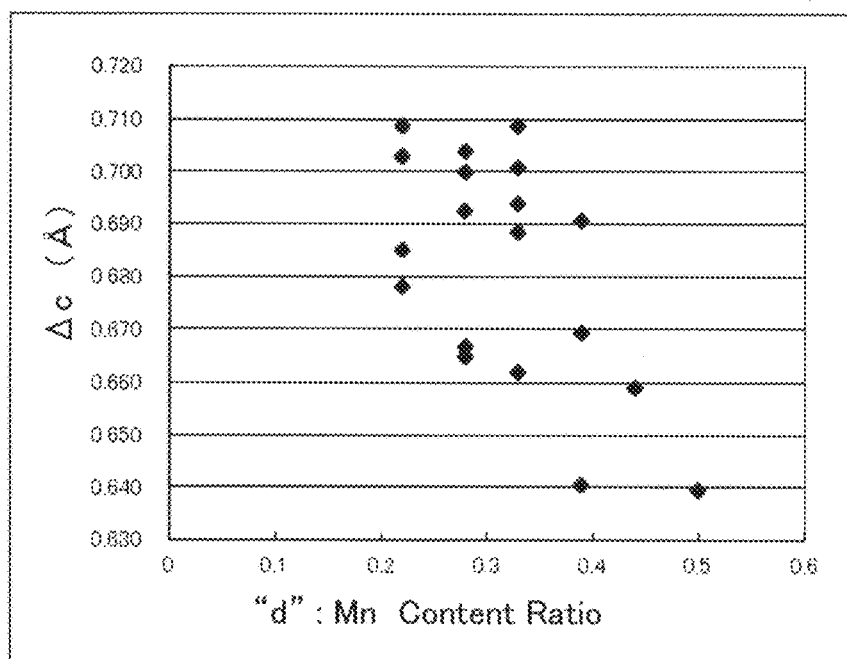
FIG. 2 is another scatter diagram showing relationships between Mn content ratio "d" and Δc which concern results given in Table 1.

Note herein that the present inventors examined a lithium composite metallic oxide having a lamellar rock-salt structure and exhibited by $LiNi_bCo_cMn_dO_2$ to compute a variation magnitude $\Delta c$ (Å) of a lattice of the c-axis when Li was eliminated in an amount of 67% from the lithium composite metallic oxide, under the following conditions using the first-principles calculation. Table 1 shows the results. Moreover, FIG. 1, and FIG. 2 illustrate a scatter diagram showing the relationships between Co content ratio "c" and $\Delta c$, and another scatter diagram showing the relationships between Mn content ratio "d" and $\Delta c$, respectively.

Software: Quantum Espresso (PWscf);
  Exchange-correlation Interaction: GGAPBE Functional;
  Calculation Method: PAW (i.e., Project Augmented Wave) Method; and
  Wave-function Cut-off: 50 Ry

TABLE 1

| Entry | Ni: "b" | Co: "c" | Mn: "d" | Δc |
|---|---|---|---|---|
| 1 | 0.5 | 0.17 | 0.33 | 0.694 |
| 2 | 0.5 | 0.11 | 0.39 | 0.640 |
| 3 | 0.5 | 0.28 | 0.22 | 0.678 |
| 4 | 0.61 | 0.11 | 0.28 | 0.667 |
| 5 | 0.39 | 0.22 | 0.39 | 0.691 |
| 6 | 0.5 | 0 | 0.5 | 0.639 |
| 7 | 0.56 | 0.11 | 0.33 | 0.662 |
| 8 | 0.56 | 0.17 | 0.28 | 0.692 |
| 9 | 0.56 | 0.22 | 0.22 | 0.703 |
| 10 | 0.5 | 0.22 | 0.28 | 0.665 |
| 11 | 0.44 | 0.11 | 0.44 | 0.659 |
| 12 | 0.44 | 0.17 | 0.39 | 0.669 |
| 13 | 0.44 | 0.22 | 0.33 | 0.688 |
| 14 | 0.44 | 0.28 | 0.28 | 0.700 |
| 15 | 0.44 | 0.33 | 0.22 | 0.685 |
| 16 | 0.39 | 0.28 | 0.33 | 0.701 |
| 17 | 0.39 | 0.33 | 0.28 | 0.704 |
| 18 | 0.33 | 0.33 | 0.33 | 0.709 |
| 19 | 0.33 | 0.44 | 0.22 | 0.709 |

From FIG. 1, the lithium composite metallic oxide is found out to have such a tendency that the smaller the Co content ratio "c" becomes the smaller $\Delta c$ is exhibited. From FIG. 2, the lithium composite metallic oxide is found out to have such another tendency that the larger Mn content ratio "d" becomes the smaller $\Delta c$ is exhibited.

The second-composition portion of the core portion has a smaller Co content ratio than does the first-composition portion, or has a larger Mn content ratio than does the first-composition portion. From the compositional relationship between the first-composition portion and the second-composition portion, and from the aforementioned results of the first-principles calculation, saying is possible that the second-composition portion has a smaller $\Delta c$ than does the first-composition portion. And, since the smaller $\Delta c$ a lithium composite metallic oxide has the less a magnitude of crystal deformations of the lithium composite metallic oxide becomes in charging and discharging, degradations are inhibited at the time of charging and discharging. Therefore, saying is possible that the following is ascertained theoretically: the second-composition portion is more stable than is the first-composition portion at the time of charging and discharging.

In the core portion, when the first-composition portion and second-composition portion are nonlocalized, inhibiting c-axis expansions, which occur in the first-composition portion, from becoming excessive is possible. Besides, since the c-axis expansions are buffered at the second-composition portion, degradations of the entire lithium composite metallic oxide are believed to be alleviated.

Moreover, since the active-material primary particles comprising the first-composition portion and second-composition portion make a single crystalline structural body, expansions occurring in the first-composition portion are buffered directly at the second-composition portion, so degradations of the active-material primary particles are inhibited. As a result of the inhibition, degradations of the entire lithium composite metallic oxide are believed to be alleviated suitably.

In addition, the present inventors discovered that, when the manganese composition ratio $Mn_{d2}$ of the second-composition portion in the core portion, is higher than the manganese composition ratio $Mn_{d1}$ of the first-composition portion, the first-composition portion has a higher value in terms of the doping ratio between "$D_{e1}$" and "$D_{e2}$" of the doping element "D." That is, "d2">"d1" makes "e1">"e2". A lithium-ion secondary battery, which uses as an active material the lithium composite metallic oxide satisfying the relationship, was turned out to have a long longevity.

Next, the high manganese portion is hereinafter explained. The high manganese portion exists in a superficial layer of the present lithium composite metallic oxide, and is a site or location made of a metallic oxide, which includes Ni, Co and Mn at least, and of which the composition ratio between Ni, Co and Mn is expressed by Ni:Co:Mn=g:h:i (note that "g"+"h"+"i"=1, 0<"g"<1, 0<"h"<"c", and "d"<"i"<1). The high manganese portion has a higher manganese composition ratio than the core portion does.

Note herein that Ni, Co and Mn are believed commonly to have the following roles in a lithium composite metallic oxide, which has a lamellar rock-salt structure and contains Ni, Co and Mn, when the lithium composite metallic oxide is used as an active material for secondary battery.

Ni is the most active at the time of Li charging/discharging reactions. Although the greater the Ni content is within an active material the more the capacity increases, the greater the Ni content is within an active material the more the active material is likely to degrade contrarily.

Mn is the most inactive at the time of Li charging/discharging reactions. Although the greater the Mn content is within an active material the more the capacity declines, the greater the Mn content is within an active material the more the active material excels in the stability of the crystal structure contrarily.

Co exhibits an intermediate activity between the activities of Ni and Mn at the time of Li charging/discharging reactions. The Co content within an active material also affects the capacity and stability to an intermediate extent between Ni and Mn.

If so, saying is possible that the high manganese portion of which the manganese composition ratio is high exhibits higher stability relatively than the core portion does. Moreover, since the high manganese portion with a high manganese composition ratio existing in a superficial portion of the present lithium composite oxide metallic oxide is capable of inhibiting an electrolyte and the core portion from directly contacting with one another, the stability of the core portion demonstrating actions as an active material upgrades.

Note that the clause, "a high manganese portion exists in a superficial layer of the present lithium composite metallic oxide," means that the high manganese portion exists in the superficial layer, regardless of the amount being more or less. As far as the high manganese portion exists in the superficial layer, the stability is kept for the lithium composite metallic oxide, which is present more inside at least than is a site or location where the high manganese portion exists. As a consequence, the advantageous effect of maintaining the capacity is demonstrated. In view of maintaining the capacity, a preferable high manganese portion exists in the entire superficial layer of the lithium composite metallic oxide.

The term, a "superficial layer," means a layer including a surface of the present lithium composite metallic oxide. From the viewpoint of the stability of the present lithium composite metallic oxide and the stability of a core portion thereof, saying is possible that the thicker a thickness of the superficial layer is the more preferably the superficial layer is made. However, no practical problem arises, as far as the superficial layer has an enough thickness for preventing the contact between an electrolytic solution and the core portion. Considering the likeliness of the progress of Li charging/discharging reactions, the thinner a thickness of the superficial layer is the more preferably the superficial layer is made. A thickness "t" (nm) of the superficial layer falls in such a range as 0<"t"<20, for instance. A preferable thickness "t" falls in such a range as 0.01<"t"<10; and a more preferable thickness "t" falls in such a range as 0.1<"t"<5.

The high manganese portion is also allowed to scatter in the superficial layer, or is even permitted to exist as a layer therein. A thickness "$s_1$" (nm) of a layer of the high manganese portion falls in such a range as 0<"$s_1$"<20, for instance. A preferable thickness "$s_1$" falls in such a range as 0.01<"$s_1$"<10; and a more preferable thickness "$s_1$" falls in such a range as 0.1<"$s_1$"<5.

Moreover, a preferable high manganese portion exists within a range of 10 nm at least from a surface of the lithium composite metallic oxide in a direction toward the center of the lithium composite metallic oxide.

From the viewpoint of upgrading the stability of the core portion, a preferable high manganese portion is put in a state of covering a surface of the core portion lamellarly. A more preferable high manganese portion is put in a state of covering a surface of the core portion entirely.

The values of aforementioned "g," "h" and "i" of the high manganese portion are not restricted at all, as far as the values satisfy the aforementioned conditions.

A preferable value of "g" falls in such a range as 0<"g"<80/100; a more preferable value thereof falls in such a range as 20/100<"g"<70/100; and a much more preferable value thereof falls in such a range as 25/100<"g" <50/100. Alternatively, a preferable value of "g" falls in such a range as 0.5×"b"<"g"<2×"b"; a more preferable value thereof falls in such a range as 0.8×"b"<"g"<1.4×"b"; and a much more preferable value thereof falls in such a range as 0.85× "b"<"g"<1.1×"b". An especially preferable value of "g" falls in such a range as 0.88×"b"<"g"≤0.96×"b".

A more preferable value of "h" falls in such a range as 5/100<"h"<"c"; and a much more preferable value thereof falls in such a range as 10/100<"h"<25/100. Alternatively, a preferable value of "h" falls in such a range as 0.2× "c"<"h"<0.9×"c"; a more preferable value thereof falls in such a range as 0.5×"c"<"h"<0.88×"c"; a much more preferable value thereof falls in such a range as 0.63×"c" "h"<0.85×"c".

A more preferable value of "i" falls in such a range as 35/100<"i"<85/100; and a much more preferable value thereof falls in such a range as 36/100<"i"<65/100. Moreover, another preferable value of "i" falls in such a range as "d"<"i"<85/100; another more preferable value thereof falls in such a range as "d"<"i"<75/100; and another much more preferable value thereof falls in such a range as "d"<"i"<65/100. In addition, still another preferable value of "i" falls in such a range as "d"<"i" <2×"d"; still another more preferable value thereof falls in such a range as 1.1×"d"<"i"<1.5× "d"; and still another much more preferable value thereof falls in such a range as 1.2×"d"<"i"≤1.41×"d".

The metallic oxidation portion is hereinafter explained. The metallic oxidation portion is a site or location of a metallic oxide existing in the outermost superficial layer of the high manganese portion. From results of the analysis in a later-described fifth evaluative example, the following are presumed: the metallic oxidation portion is made of a metallic oxide comprising a metal "M" selected from the group consisting of Ni, Co and Mn; and is expressed by a compositional formula which is different from the compositional formula of the high manganese portion. The metallic oxidation portion is presumed to be expressed by such a compositional formula as $Li_qM_2O_{3+r}$ (where 0≤"q"<1, and 0≤"r"<1). Although "r" is presumed to fall in such a range as 0≤"r"<1, "r" has such possibilities as 0≤"r"<0.5, or 0≤"r"<0.3. Moreover, the metallic oxidation portion is presumed to act as a protective film for the high manganese portion.

Although the metallic oxidation portion demonstrates actions as the protective film even when being either crystalline or amorphous, the metallic oxidation portion being crystalline demonstrates the protective actions suitably, because being crystalline excels more in the stability than being the other.

Note that the clause, "a metallic oxidation portion exists in an outermost superficial layer of the high manganese portion," means that the metallic oxidation portion exists in the outermost superficial layer of the high manganese portion, regardless of the amount being more or less. As far as the metallic oxidation portion exists in the outermost superficial layer of the high manganese portion, the stability is kept for the high manganese portion, which is present more inside at least than is a site or location where the metallic oxidation portion exists. From the viewpoint of upgrading the stability of the high manganese portion, a preferable metallic oxidation portion is put in a state of covering a surface of the high manganese portion lamellarly. A more preferable metallic oxidation portion is put in another state of covering the entire surface of the high manganese portion.

When the metallic oxidation portion is lamellar, saying is possible that the thicker a thickness of the metallic oxidation portion is the more preferably the metallic oxidation portion is made, from the viewpoint of the stability. However, considering the likeliness of the progress of Li charging/discharging reactions, the thinner a thickness of the metallic oxidation portion is the more preferably the metallic oxidation portion is made. A thickness "$t_3$" (nm) of a layer of the metallic oxidation portion falls in such a range as $0<$"$t_3$"$<10$, for instance. A preferable thickness "$t_3$" falls in such a range as $0.01<$"$t_3$"$<5$; a more preferable thickness "$t_3$" falls in such a range as $0.1<$"$t_3$"$<3$; a much more preferable thickness "$t_3$" falls in such a range as $0.3<$"$t_3$"$<1$; and a most preferable thickness "$t_3$" falls in such a range as $0.4<$"$t_3$"$<0.8$.

The present lithium composite metallic oxide is not at all restricted especially in the configuration. However, mentioning the configuration in light of an average particle diameter, a preferable average particle diameter is 100 μm or less; a more preferable average particle diameter is from one μm or more to 50 μm or less; a much more preferable average particle diameter is from one μm or more to 30 μm or less; and an especially preferable average particle diameter is from two μm or more to 20 μm or less. In lithium composite metallic oxides with an average particle diameter of less than one μm, such a drawback arises probably that the adhesiveness between an active material and a current collector is likely to be impaired, or the like, upon fabricating an electrode. Lithium composite metallic oxides with an average particle diameter exceeding 100 μm probably lead to affecting the size of an electrode, to causing such a drawback that the separator constituting a secondary battery has been damaged, and so on. Note that, unless limited otherwise especially, an "average particle diameter" in the present specification means "$D_{50}$" when measured by a common laser-diffraction type particle-diameter-distribution meter.

Since the high manganese portion and metallic oxidation portion account for a slight volume compared with the volume of the entire present lithium composite metallic oxide. Consequently, even when the high manganese portion and metallic oxidation portion exist, the compositional formula expressing the present lithium composite metallic oxide do not change at all virtually.

Next, a production process for the present lithium composite metallic oxide is hereinafter explained.

The present lithium composite metallic oxide is producible by carrying out any of following Treatments 1 through 5 to a material having a lamellar rock-salt structure, and expressed by a general formula, $Li_aNi_b$-$Co_cMn_dD_eO_f$ (where $0.2\leq$"a"$\leq 1.5$, "b"+"c"+"d"+"e"=1, $0<$"e"$<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7\leq$"f"$\leq 2.1$). Note that the "material" is hereinafter referred to sometimes as a "metallic oxide material." Moreover, carrying out any of following Treatments 1 through 5 to the "metallic oxide material" is hereinafter referred to sometimes as a "surface modification." In addition, an "aqueous solution" used in any of following Treatments 1 through 5 is hereinafter referred to sometimes as an "aqueous solution for surface modification."

(Treatment 1) comprising the steps of:
1-1) readying an acidic metallic salt aqueous solution;
1-2) mixing the acidic metallic salt aqueous solution with the aforementioned material;
1-3) mixing a liquid obtained at said step 1-2) with an ammonium-phosphate salt aqueous solution; and
1-4) isolating the lithium composite metallic oxide from another liquid obtained at said step 1-3);

(Treatment 2) comprising the steps of:
2-1) readying an ammonium-phosphate salt aqueous solution;
2-2) mixing the ammonium-phosphate salt aqueous solution with the aforementioned material;
2-3) mixing a liquid obtained at said step 2-2) with an acidic metallic salt aqueous solution; and
2-4) isolating the lithium composite metallic oxide from another liquid obtained at said step 2-3);

(Treatment 3) comprising the steps of:
3-1) readying an aqueous solution of an ammonium-phosphate salt, or an aqueous solution of a metallic salt and an ammonium-phosphate salt;
3-2) mixing the aqueous solution with the aforementioned material; and
3-3) isolating the lithium composite metallic oxide from a liquid obtained at said step 3-2);

(Treatment 4) comprising the steps of:
4-1) readying an acidic metallic salt aqueous solution, and an ammonium-phosphate salt aqueous solution, respectively;
4-2) mixing water with the aforementioned material;
4-3) mixing a liquid obtained at said step 4-2), said acidic metallic salt aqueous solution, and said ammonium-phosphate salt aqueous solution each other; and
4-4) isolating the lithium composite metallic oxide from another liquid obtained at said step 4-3); or (Treatment 5) comprising the steps of:
5-1) readying a metallic phosphate salt aqueous solution, or a metallic polyphosphate salt aqueous solution;
5-2) mixing the aqueous solution with the aforementioned material; and
5-3) isolating the lithium composite metallic oxide from a liquid obtained at said step 5-2).

Treatments 1 through 5 are hereinafter described more concretely.

Treatment 1: an acidic metallic salt aqueous solution is readied, and then a metallic oxide material is added to and stirred in the readied aqueous solution to make a mixed-and-dispersed solution. Subsequently, an ammonium-phosphate salt aqueous solution is further added to and stirred in the above-mentioned mixed-and-dispersed solution being put in a stirred state. The stirring operation is continued for from 15 minutes to one hour approximately. The present lithium composite metallic oxide is isolated by filtering.

Treatment 2: an ammonium-phosphate salt aqueous solution is readied, and then a metallic oxide material is added to and stirred in the readied aqueous solution to make a mixed-and-dispersed solution. Subsequently, an acidic metallic-salt aqueous solution is further added to and stirred in the above-mentioned mixed-and-dispersed solution being put in a stirred state. The stirring operation is continued for from 15 minutes to one hour approximately. The present lithium composite metallic oxide is isolated by filtering.

Treatment 3: an aqueous solution of an ammonium-phosphate salt, or an aqueous solution of a metallic salt and an ammonium-phosphate salt is readied, and then a metallic oxide material is added at a time to and stirred in the readied aqueous solution. The stirring operation is continued for from 15 minutes to one hour approximately. The present lithium composite metallic oxide is isolated by filtering.

Treatment 4: an acidic metallic-salt aqueous solution, and an ammonium-phosphate salt aqueous solution are readied, respectively. A metallic oxide material is stirred within ion-exchanged water to make a mixed-and-dispersed solution. Subsequently, two kinds of the aforementioned aqueous solutions are added respectively or simultaneously to the aforementioned mixed-and-dispersed solution and stirred therein. The present lithium composite metallic oxide is isolated by filtering.

Treatment 5: a metallic phosphate salt aqueous solution, or a metallic polyphosphate salt aqueous solution is readied. A metallic oxide material is admixed to and stirred in the aqueous solution to make a mixed-and-dispersed solution. The stirring operation is continued for from 15 minutes to one hour approximately. The present lithium composite metallic oxide is isolated by filtering.

As for the metallic salt used in any of Treatment 1 through Treatment 4, a metallic nitrate having less influences on batteries even when residing in an active material is preferable. As for the metallic nitrate, the following are exemplifiable: magnesium nitrate, barium nitrate, strontium nitrate, aluminum nitrate, or cobalt nitrate.

As for the ammonium-phosphate salt used in any of Treatment 1 through Treatment 4, the following are exemplifiable: diammonium hydrogen phosphate, ammonium dihydrogenphosphate, or ammonium phosphate. An especially preferable option is diammonium hydrogen phosphate. Moreover, as for a method for preparing the ammonium-phosphate salt aqueous solution, the following are givable: a method of preparing the aqueous solution by dissolving diammonium hydrogen phosphate, ammonium dihydrogen phosphate or ammonium phosphate in water; or a method of preparing the aqueous solution by mixing a phosphoric acid and ammonia with one another, and the like. As for the ammonium-phosphate salt aqueous solution used in any of Treatment 1 through Treatment 4, a weakly-alkaline ammonium-phosphate salt aqueous solution is preferable.

The following aqueous solutions used in any of Treatment 1 through Treatment 4 are not at all limited especially in terms of the concentrations: the metallic salt aqueous solution, and the ammonium-phosphate salt aqueous solution, as well as the aqueous solutions containing a metallic salt and ammonium-phosphate salt. However, a preferable metallic salt aqueous solution has a metallic salt in a concentration falling within a range of from 0.2 to 10% by mass. Moreover, a preferable ammonium-phosphate salt aqueous solution has an ammonium-phosphate salt in a concentration falling within a range of from 0.2 to 50% by mass. In addition, a preferable aqueous solution contains a metallic salt and an ammonium-phosphate salt in a concentration falling within a range of from 0.2 to 10% by mass, respectively.

As for a metal of the metallic phosphate salt or metallic polyphosphate salt used in Treatment 5, the following are exemplifiable: magnesium, barium, strontium, aluminum, or cobalt. As for a phosphate anion constituting the metallic phosphate salt, the following are givable: $H_2PO_4^-$, $HPO_4^{2-}$, or $PO_4^{3-}$. A polyphosphoric acid is expressed by $HO—(HPO_3)_n—H$ (where "n" is an integer of two or more). As for a preferable metallic polyphosphate salt, magnesium pyrophosphate is givable.

A preferable metallic phosphate salt aqueous solution or metallic polyphosphate salt aqueous solution according to Treatment 5 includes the metallic phosphate salt or metallic polyphosphate salt in a concentration of from 0.01 to 15% by mass. A more preferable concentration of the metallic phosphate salt or metallic polyphosphate salt is from 0.1 to 5% by mass; a much more preferable concentration thereof is from 0.2 to 1% by mass; and an especially preferable concentration thereof is from 0.3 to 0.5% by mass.

Setting up a time for the stirring operation appropriately is allowed in any of Treatment 1 through Treatment 5.

After any of Treatment 1 through Treatment 5, drying and/or calcining the present lithium composite metallic oxide is also permitted. The drying operation is a step for removing water adhered onto the present lithium composite metallic oxide, is carried out allowably within a range of from 80 to 150° C. for from one to 24 hours or from one to 10 hours approximately, and is carried out effectively even under a depressurized condition. The calcining operation is a step for fixing the crystallinity of the present lithium composite metallic oxide, is carried out permissibly within a range of from 400 to 1,200° C., from 500 to 1,000° C. or from 600 to 900° C., for from one to 10 hours or from one to 5 hours approximately. After the calcining step, carrying out a pulverization treatment is also allowed to give a desirable particle diameter to the present lithium composite metallic oxide. Note that the drying step and calcining step do not have any marked influence on the composition ratio in the present lithium composite metallic oxide.

The generation of the high manganese portion and metallic oxidation portion by the surface modification, as well as the thickness of the layers are ascertainable and measurable by doing a compositional analysis after measuring a cut face, which is made by cutting the present lithium composite metallic oxide, with a TEM-EDX, a combination of a transmission-type electron microscope and an energy dispersion-type X-ray spectroscopic analyzing device, for instance. When observing the cut face of the present lithium composite metallic oxide, the constituent elements are found out to exist in the following order: from the side of a superficial layer, the metallic oxidation portion, the high manganese portion, and the core portion.

Whether the respective portions are crystalline or amorphous is ascertainable with an FFT profile, which is illustrated by subjecting an electron-beam diffraction pattern obtained by a TEM to a fast Fourier transformation, for instance. Moreover, such an instance also arises as whether the respective portions are crystalline or not is judgeable from the observation of a TEM image.

In the production process for the present lithium composite metallic oxide, the high manganese portion of which the composition ratio is Mn rich is obtainable, although no Mn is added by aforementioned Treatments 1 through 5. Hence, a technology according to the present invention is a totally different technology from such a technology as Mn or an Mn-containing compound is added to a material to adhere the Mn or Mn-containing compound on a surface of the material or in a vicinity of the surface. Moreover, as being apparent from separating the lithium composite metallic oxide from the aqueous solutions for surface modification in aforementioned Treatments 1 through 5, and from the fact that no P or Mg, and the like, deriving from the surface-modifying aqueous solutions were detected from active materials according to reference examples described below, the present lithium composite metallic oxide and production process are quite distinct from an active material coated with a phosphorous-containing layer disclosed in Japanese Unexamined Patent Publication (KOKAI) Gazette No. 2003-7299, for instance, and from a production process for the same disclosed therein.

Although the Mn composition ratio in the high manganese portion becomes higher than the Mn composition in the core portion by carrying out aforementioned Treatments 1 through 5, the Co composition ratio becomes low contrarily. The Ni composition ratio also becomes high in an occasion, or even becomes low in another occasion. And, in consideration of the fact that no Mn is added by aforementioned Treatments 1 through 5, Co in a vicinity of the superficial layer of the metallic oxide material is assumably eluted into the aqueous solutions (and Ni therein is also eluted thereinto depending on cases) by means of aforementioned Treatments 1 through 5. As a consequence, changes are assumably enabled to arise in the superficial-layer composition ratios. The likeliness of eluting into the aqueous solutions seems to be ordered as follows Co, Ni, and Mn.

If so, the high manganese portion is also expressible by a general formula: $Li_{a3}Ni_{b3}Co_{c3}Mn_{d3}D_{e3}O_{f3}$ (where $0.2 \leq \text{``a3''} \leq 1.5$, $\text{``b3''}+\text{``c3''}+\text{``d3''}+\text{``e3''}<1$, $0<\text{``b3''}\leq\text{``b''}$, $0<\text{``c3''}<\text{``c''}$, $0<\text{``d3''}\leq\text{``d''}$, $0<\text{``e3''}<1$, "D" is at least one element selected from the group consisting of Li, Fe, Cr, Cu, Zn, Ca, Mg, Zr, S, Si, Na, K and Al, and $1.7 \leq \text{``f3''} \leq 2.1$).

The present lithium composite metallic oxide is graspable as a lithium composite metallic oxide in which the superficial layer of a metallic oxide material in the raw material is changed into a new superficial layer comprising the high manganese portion and metallic oxidation portion, namely, as a lithium composite metallic oxide in which the metallic oxide material has underwent a surface modification.

To produce the metallic oxide material, following a publicly-known conventional production process using a metallic oxide, a metallic hydroxide, or a metallic salt like a metallic carbonate, and a doping element "D"-containing compound is also allowed; or using such a material as being available commercially is even permitted.

When using lithium carbonate, nickel sulfate, manganese sulfate and cobalt sulfate to produce the metallic oxide material, the production is allowed to be done as follows (i.e., a coprecipitation method), for instance. A sulfate-salt aqueous solution including nickel sulfate, cobalt sulfate and manganese sulfate in a predetermined amount, respectively, is alkalified to obtain a coprecipitated slurry, and then the slurry is dried to obtain a nickel/cobalt/manganese composite hydroxide. The metallic oxide material is obtainable by admixing lithium carbonate and a doping element "D"-containing element in a predetermined amount, respectively to the nickel/cobalt/manganese composite hydroxide, and then calcining the lithium carbonate, doping element "D"-containing element and nickel/cobalt/manganese composite hydroxide. Giving the obtained metallic oxide material a desirable particle diameter is also allowed by appropriately carrying out a pulverization treatment to the metallic oxide material.

The metallic oxide material is also producible by using a known method, such as a solid phase method, a spray drying method, a hydrothermal method or a molten salt method, to a mixed raw material comprising a lithium raw material containing lithium, and a metallic raw material including one or more members selected from the group consisting of Ni, Mn and Co, as well as a doping element "D"-containing compound.

The solid phase method is a method for obtaining the metallic oxide material by mixing or pulverizing a powder of the mixed raw material, drying or powder-compact molding the powder, if needed, and then heating or calcining the powder. A solid phase method having been carried out usually is such that the respective raw materials are mixed each other in proportions in compliance with the composition of a metallic oxide material to be produced. A preferable temperature for heating the raw-material mixture in the solid phase method is from 900° C. or more to 1,000° C. or less, and a preferable time for heating the raw-material mixture therein is from eight hours or more to 24 hours or less.

The spray drying method is a method in which a powder of the mixed raw material is dissolved in a liquid to make a solution, the solution is sprayed into the air to make a mist, and then the solution having been turned into the mist is heated. A preferable temperature for heating the misted solution in the spray drying method is from 500° C. or more to 1,000° C. or less, and a preferable time for heating the misted solution therein is from three hours or more to eight hours or less.

The hydrothermal method is a method in which the raw materials are mixed with water to make a mixed liquid, and the mixed liquid is heated at a high temperature under a high pressure. A preferable temperature for heating the mixed liquid in the hydrothermal method is from 120° C. or more to 200° C. or less, and a preferable time for heating the mixed liquid therein is from two hours or more to 24 hours or less.

The molten salt method is a method in which a lithium raw material is fused to turn into a molten salt by heating a raw-material mixture including the lithium raw material, and then the metallic oxide material is synthesized within a liquid of the molten salt. In the molten salt method, the lithium raw material not only makes a supply source of Li, but also performs a role of adjusting the oxidizing power of the molten salt. A preferable ratio of Li in the metallic oxide material to Li in the lithium raw material (i.e., (Li in Metallic Oxide Material)/(Li in Lithium Raw Material)) is allowed to be less than one by molar ratio. However, the ratio is preferably from 0.02 or more to less than 0.7, is more preferably from 0.03 to 0.5, and is much more preferably from 0.04 to 0.25, by molar ratio.

Production processes for the metallic oxide material are explained for instances where the core portion is constituted of the first-composition portion and second-composition portion.

First of all, when the first-composition portion and second-composition portion are localized, producing the metallic oxide material is allowed while adding a doping element "D"-containing compound appropriately with reference to the production processes disclosed in Japanese Unexamined Patent Publication (KOKAI) Gazette No. 2013-182782 and Japanese Unexamined Patent Publication (KOKAI) Gazette No. 2013-182783. Note that the term, the "delocalization of the first-composition portion and second-composition portion" in the present specification means that, like the active materials disclosed in Japanese Unexamined Patent Publication (KOKAI) Gazette No. 2013-182782 and Japanese Unexamined Patent Publication (KOKAI) Gazette No. 2013-182783 as referred to above, the first-composition portion and second-composition portion are not localized at all at one site or location, respectively.

Next, when the first-composition portion and second-composition portion are delocalized, the metallic oxide material is producible by the following two ways of the production process.

A first production process comprises steps a) through f), and step D1) as described below.
  a) a step of dissolving a nickel salt, a cobalt salt and a manganese salt into water to prepare a first aqueous solution of which the molar ratio between nickel, cobalt and manganese is "b1'":"c1'":"d1'" (where "b1'"+"c1'"+"d1'"=10);
  b) a step of dissolving a nickel salt, a cobalt salt and a manganese salt into water to prepare a second aqueous solution of which the molar ratio between nickel, cobalt and manganese is "b2'":"c2'":"d2'" (where "b2'"+"c2'"+"d2'"=10 (note that at least any of the following is satisfied: "c2'"<"c1'"; or "d2'">"d1'"));
  c) a step of preparing a basic aqueous solution;
  d) a step of simultaneously supplying the first aqueous solution and the second aqueous solution to the basic aqueous solution to form first primary particles including nickel, cobalt and manganese in such a molar ratio as "b1'":"c1'":"d1'", as well as second primary particles including nickel, cobalt and manganese in such a molar ratio as "b2'":"c2'":"d2'";

e) a step of forming combined particles in which the first primary particles and the second primary particles are combined with each other;

f) a step of mixing the combined particles and a lithium salt, and then calcining the resulting mixture; and D1) a step of adding a doping element "D"-containing compound at any step of steps a) through e), or at a point of time before the calcination in step f).

A second production process comprises steps a) through c), and steps g) through l), as well as step D2) as described below.

a) a step of dissolving a nickel salt, a cobalt salt and a manganese salt into water to prepare a first aqueous solution of which the molar ratio between nickel, cobalt and manganese is "b1'":"c1'":"d1'" (where "b1'"+"c1'"+"d1'"=10);

b) a step of dissolving a nickel salt, a cobalt salt and a manganese salt into water to prepare a second aqueous solution of which the molar ratio between nickel, cobalt and manganese is "b2'":"c2'":"d2'" (where "b2'"+"c2'"+"d2'"=10 (note that at least any of the following is satisfied: "c2'"<"c1'"; or "d2'">"d1'"));

c) a step of preparing a basic aqueous solution;

g) a step of supplying the first aqueous solution to the basic aqueous solution to form first primary particles including nickel, cobalt and manganese in such a molar ratio as "b1'":"c1'":"d1'";

h) a step of heating the first primary particles to turn the first primary particles into a first dehydrated substance;

i) a step of supplying the second aqueous solution to the basic aqueous solution to form second primary particles including nickel, cobalt and manganese in such a molar ratio as "b2'":"c2'":"d2'";

j) a step of heating the second primary particles to turn the second primary particles into a second dehydrated substance;

k) a step of mixing the first dehydrated substance and the second dehydrated substance by a particles compositing apparatus to produce dehydrated combined particles in which the first dehydrated substance and the second dehydrated substance are combined with one another;

l) a step of mixing the dehydrated combined particles and a lithium salt, and then calcining the resulting mixture; and D2) a step of adding a doping element "D"-containing compound at any step of steps a) through c) and steps g) through k), or at a point of time before the calcination in step l).

Note herein that the first aqueous solution at step a), the first primary particles at step d), the first primary particles at step g), and the first dehydrated substance at step h) make bases of the nickel, cobalt and manganese compositions of the first-composition portion in the present lithium composite metallic oxide. Moreover, the second aqueous solution at step b), the second primary particles at step d), the second primary particles at step i), and the second dehydrated substance at step j) make bases of the nickel, cobalt and manganese compositions of the second-composition portion in the present lithium composite metallic oxide. Hence, the molar ratios of nickel, cobalt and manganese at step a) or step b) are set up allowably to match the molar ratios of nickel, cobalt and manganese in the targeted first-composition portion or second-composition portion. Note that, since such instances arise as the molar ratios of nickel, cobalt and manganese in the first-composition portion or second-composition portion change gently in the course of production like the calcination, the molar ratios of nickel, cobalt and manganese in the first aqueous solution or second aqueous solution do not necessarily coincide with the molar ratios of nickel, cobalt and manganese in the first-composition portion or second-composition portion.

Moreover, the combined particles at step e), and the dehydrated combined particles at step k) make bases of the active-material first particles.

As for the nickel salt used at step a) and step b), nickel sulfate, nickel carbonate, nickel nitrate, nickel acetate, and nickel chloride are givable, for instance. As for the cobalt salt used at the steps, cobalt sulfate, cobalt carbonate, cobalt nitrate, cobalt acetate, and cobalt chloride are givable, for instance. As for the manganese salt used at the steps, manganese sulfate, manganese carbonate, manganese nitrate, manganese acetate, and manganese chloride are givable, for instance.

A preferable metallic concentration of the first aqueous solution or second aqueous solution falls in a range of from 0.01 to four mol/L. A more preferable range thereof is from 0.05 to three mol/L; a much more preferable range thereof is from 0.1 to two mol/L; and an especially preferable range thereof is from 0.5 to 1.5 mol/L. In the first production process, making the metallic concentrations of the first aqueous solution and second aqueous solution comparative with one another is preferable, because the formation rates of the two primary particles at step d) become comparable with one another. In consideration of the fact that the metals included in the aqueous solutions are caused to precipitate in the later steps, the first aqueous solution or second aqueous solution having a higher concentration is preferable.

A preferable pH of the basic aqueous solution at step c) falls in a range of from nine to 14. A more preferable range is from 10 to 13.5; and a much more preferable range is from 11 to 13. Note that the pH prescribed in the present specification refers to a value when measured at 25° C. As for an employable basic compound, compounds dissolving into water to exhibit basicity are allowed. For example, the following are givable: ammonia; alkali metal hydroxide, such as sodium hydroxide, potassium hydroxide or lithium hydroxide; alkali metal carbonate, such as sodium carbonate, potassium carbonate or lithium carbonate; alkali metal phosphate, such as trisodium phosphate, tripotassium phosphate or trilithium phosphate; and alkali metal acetate, such as sodium acetate, potassium acetate or lithium acetate. One of the basic compounds is also allowed to be used independently, or a plurality of the basic compounds are even permitted to be used combinedly. In the aqueous solutions at step d), step e), step g) and step i), since keeping the respective pHs in a suitable range is preferred, a preferable basic aqueous solution at step c) includes a basic compound having buffering ability at least. As for the basic compound having buffering ability, ammonia, alkali metal carbonate, alkali metal phosphate, and alkali metal acetate are givable, for instance.

Carrying out step c) in a reaction vessel equipped with a stirring apparatus is preferable. Moreover, carrying out step c) in the reaction vessel further equipped with an apparatus capable of introducing an inert gas, such as nitrogen or argon, is more preferable. In addition, the reaction vessel furthermore equipped with an apparatus establishing a constant-temperature condition is much more preferable. A specific example of step c) is given hereinafter. Water is charged into a reaction vessel equipped with a stirring apparatus, a nitrogen-gas introducing apparatus and a heating apparatus, and is then heated to 40° C. A nitrogen gas is introduced into the reaction vessel to put the inside under a nitrogen-gas atmosphere. A sodium hydroxide aqueous solution, and an ammonium aqueous solution are then charged into the reaction vessel to prepare the basic aqueous solution.

Hereinafter, steps d) through f) of the first production process are explained.

Step d) is a step in which the first aqueous solution and second aqueous solution are supplied simultaneously to the basic aqueous solution from distinct locations or sites to simultaneously form the first primary particles and second primary particles, respectively. The first primary particles and second primary particles comprise hydroxides of metals included in the first aqueous solution and second aqueous solution, respectively. At step d), hydroxides of the metallic ions included in the first aqueous solution and second aqueous solution arise, the hydroxides form particulate nuclei, respectively, and then the particulate nuclei form primary particles with constant size, respectively. The respective primary particles are presumed to be in a state of single crystal. The first primary particles and second primary particles have a particulate length of 1,000 nm or less roughly upon observed by a microscope, and the particulate length falls in a range of from 80 to 1,000 nm roughly. Note that, in the present specification, the term, a "particulate length," means a length at the longest site or location in the respective particles at the time of observation.

Figure 3:
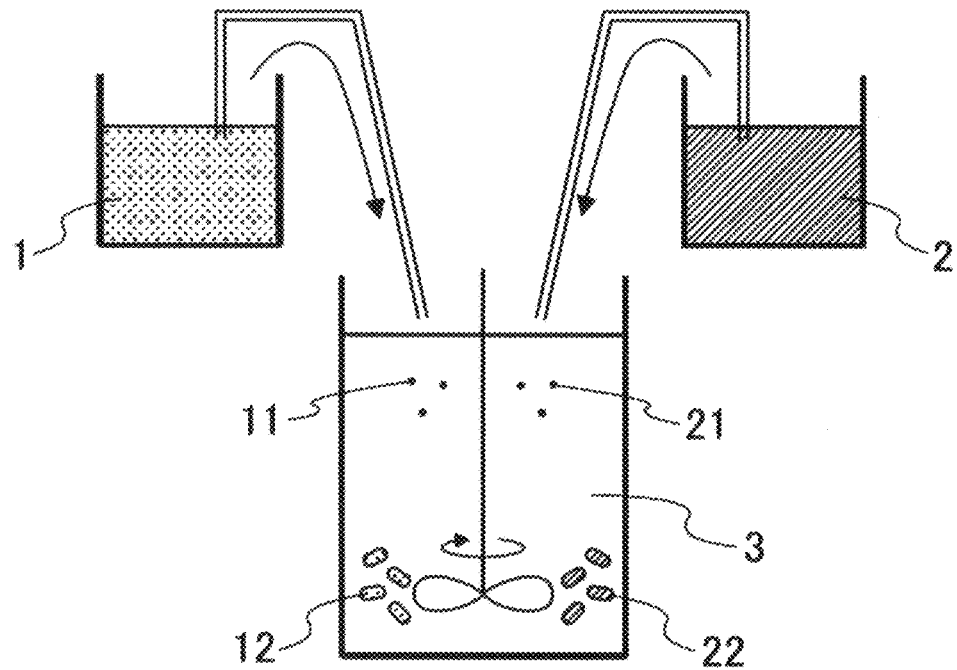
FIG. 3 is a schematic diagram of step d)

FIG. 3 illustrates a schematic diagram of step d). As illustrated in FIG. 3, each of a first aqueous solution 1 and second aqueous solution 2 is supplied to a basic aqueous solution 3 simultaneously. Then, metallic ions included in the first aqueous solution 1 turn into hydroxides within the basic aqueous solution 3 to form first particulate nuclei 11 and thereafter form first primary particles 12 with constant size. Likewise, metallic ions included in the second aqueous solution 2 turn into hydroxides within the basic aqueous solution 3 to form second particulate nuclei 21 and thereafter form second primary particles 22 with constant size.

Preferable step d) is carried out under the same conditions as described for step c). Setting up the stirring speed and temperature conditions appropriately is allowed to fall in the suitable ranges for generating the nuclei and forming the primary particles. As a preferable stirring speed, from 50 to 10,000 rpm are givable. Moreover, the following are givable: more preferably, from 100 to 3,000 rpm; and, much more preferably, from 200 to 1,500 rpm. When the pH of the basic aqueous solution fluctuates as accompanied by the supply of the first aqueous solution and second aqueous solution, or when the basic compound, like ammonia, is lost from the reaction vessel because of the vaporization, supplying appropriately the aqueous solution including a basic compound, which is employed at step c), is permitted to maintain a suitable appropriate pH or ammonium concentration for generating the nuclei and forming the primary particles. From the viewpoint of stability of the step, a supplying seed of the first aqueous solution, and a supplying speed of the second aqueous solution are preferred to be constant. As a preferable supplying speed, from one to 30 mL/min are givable. Moreover, the following are givable: more preferably, from 1.5 to 15 mL/min; and, much more preferably, from two to eight mL/min.

Step e) is a step for forming combined particles in which the first primary particles and second primary particles are combined with each other. To be concrete, step e) is a step of retaining and/or stirring the liquid resulting from step d) continuously while reducing the liquid, if needed. Preferable step e) is carried out in succession to step d). Moreover, at step e), the first aqueous solution, the second aqueous solution, and the aqueous solution including the basic compound are allowably supplied appropriately in the same manner as step d). Such an instance sometimes arises as making a distinction strictly between step e) and step d) is difficult. From the relationship between solubilities of the respective particles, step e) is performed preferably while reducing an amount of the liquid less than the amount at step d). In addition, at step e), the liquid is retained and/or stirred preferably until the combined particles become a desirable size. The combined particles have a particulate length of 20 μnm or less roughly upon observed by a microscope, and the particulate length falls in a range of from two to 20 μnm roughly. The obtained combined particles are separable by filtration. Resupplying the post-separation combined particles to step e) is also allowed, if needed. The post-separation combined particles are even permitted to undergo dehydration under a heating condition. As for the heating conditions, from 100 to 400° C., and from one to 50 hours are givable. Note that, at step e), such an instance arises occasionally as other combined particles, in which combinations occur between the first primary particles or in which combinations occur between the second primary particles, are obtainable, in addition to the combined particles in which the first primary particles and second primary particles are combined with each other. Moreover, such another instance arises occasionally as still other combined particles, in which a plurality of the combined particles are combined, are obtainable.

Figure 4:
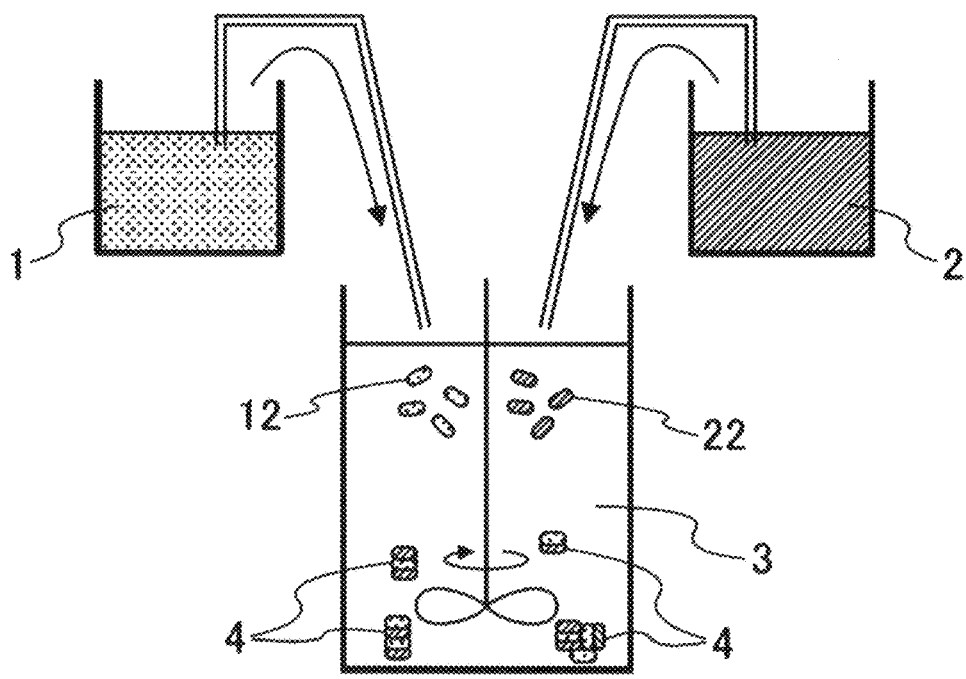
FIG. 4 is a schematic diagram of step e)

FIG. 4 illustrates a schematic diagram of step e). As illustrated in FIG. 4, the stirring operation causes the first primary particles 12 and second primary particles 22 to collide each other. Accordingly, combined particles 4, in which the first primary particles 12 and second primary particles 22 are combined with each other, are formed.

Step f) is a step in which the combined particles obtained at step e) and a lithium salt are mixed, and are then calcined to obtain the metallic oxide material. As for the lithium salt, lithium carbonate, lithium hydroxide, lithium nitrate, lithium acetate, lithium oxalate, and halogenated lithium are exemplifiable. Appropriately determining a compounding amount of the lithium salt is allowed so as to make active materials with desirable lithium compositions. An example is given as follows: determining a compounding amount of lithium is permitted so as to make a molar ratio between lithium and a sum of nickel, cobalt and manganese fall within a range of from 0.2:1 to 1.2:1 in the entirety of raw materials used at step f).

As for the mixing apparatus, a mortar and pestle, a stirring mixer, a "V"-type mixer, a "W"-type mixer, a ribbon-type mixer, a drum mixer, and a ball mill are exemplifiable.

Setting up calcination conditions appropriately is allowed within ranges of from 500 to 1,000° C. and from one to 20 hours, for instance. Changing the calcination temperature in the course of calcination is even permitted to do the calcination at a plurality of temperatures. As suitable calcination conditions, the following are exemplifiable: carrying out a primary calcination under such conditions as at from 600 to 800° C. and for from eight to 12 hours; and subsequently carrying out a secondary calcination under such conditions as at from 800 to 1,000° C. and for from three to seven hours. The metallic oxide material, which is obtained after the calcination, is preferably turned into a metallic oxide material with a predetermined grain size distribution via a pulverizing step and classifying step. As for a range of the grain size distribution, exhibiting an average particle diameter (or $D_{50}$) of 100 μm or less in the measurement by a common laser-scattering diffraction-type particle-diameter-distribution meter is preferable; exhibiting an average particle diameter of from one μm or more to 50 μm or less therein is more preferable; exhibiting an average particle diameter of from one μm or more to 30 μm or less therein is much more preferable; and exhibiting an average particle diameter of from two μm or more to 20 μm or less therein is especially preferable.

Step D1) is a step in which a doping element "D"-containing compound is added at any step of steps a) through e), or at a point of time before the calcination in step f). Appropriately determining a compounding amount of the doping element "D"-containing compound is allowed so as to make a desirable doping amount (i.e., "$D_e$"). As for the doping element "D"-containing compound, the following are givable: doping element "D"-containing oxides, doping element "D"-containing hydroxides, doping element "D"-containing sulfates, doping element "D"-containing nitrates, doping element "D"-containing phosphates, and doping element "D"-containing halides. For example, when the doping element "D" is zirconium, the following are givable specifically: zirconium oxide, zirconium hydroxide, zirconium sulfate, zirconium nitrate, zirconium phosphate, and zirconium halide.

Hereinafter, steps g) through 1) and step D2) of the second production process are explained.

Step g) is a step in which the first aqueous solution is supplied to the basic aqueous solution to form the first primary particles. The respective conditions of step g) are allowably such conditions as specifics, which relate to the second aqueous solution and second primary particles, are excluded from the aforementioned explanations on step d).

Step h) is a step of heating the first primary particles, which are obtained at step g) and comprise metallic hydroxides, to turn the first primary particles into a first dehydrated substance. As for the heating conditions, from 100 to 400° C., and from one to 50 hours are givable, for instance.

Step i) is a step in which the second aqueous solution is supplied to the basic aqueous solution, which is prepared at step c), to form the second primary particles. The respective conditions of step i) are allowably such conditions as specifics, which relate to the first aqueous solution and first primary particles, are excluded from the aforementioned explanations on step d).

Step j) is a step of heating the second primary particles, which are obtained at step i) and comprise metallic hydroxides, to turn the second primary particles into a second dehydrated substance. As for the heating conditions, from 100 to 400° C., and from one to 50 hours are givable, for instance.

Step k) is a step in which the first dehydrated substance and second dehydrated substance are mixed by a particles compositing apparatus to form dehydrated combined particles in which the first dehydrated substance and second dehydrated substance are combined one another. As for the particles compositing apparatus, the following are exemplifiable: Hybridization Systems "NHS" and "MIRALO" of NARA MACHINERY Co., Ltd., "MECANOFUSION" and "NOBILTA" of HOSOKAWA MICRON CORPORATION, "THETA COMPOSER" of TOKUJU CORPORATION.

Step l) is a step of mixing and then calcining the dehydrated combined particles and a lithium salt to obtain the metallic oxide material, and specific conditions therefor are the same as the conditions for step f).

Step D2) is a step in which a doping element "D"-containing compound is added at any step of steps a) through c) and steps g) through k), or at a point of time before the calcination in step l). The specific conditions are the same as the conditions for step D1).

Using the present lithium composite metallic oxide makes a lithium-ion secondary battery manufacturable. Hereinafter, a lithium-ion secondary battery comprising the present lithium composite metallic oxide is sometimes referred to as a "lithium-ion secondary battery according to the present invention." In addition to an electrode (a positive electrode, for instance) including the present lithium composite metallic oxide, the present lithium-ion secondary battery further comprises a negative electrode, a separator and an electrolytic solution, as battery constituent elements.

The positive electrode is constituted of a current collector, and an active-material layer including the present lithium composite metallic oxide as an active material. Note that, in the active-material layer, further including an active material other than the present lithium composite metallic oxide is also allowed.

A "current collector" refers to a chemically inactive high electron conductor for keeping an electric current flowing to electrodes during the discharging or charging operations of a lithium-ion secondary battery. As for the current collector, the following are exemplifiable: at least one member selected from the group consisting of silver, copper, gold, aluminum, magnesium, tungsten, cobalt, zinc, nickel, iron, platinum, tin, indium, titanium, ruthenium, tantalum, chromium, and molybdenum; as well as metallic materials, such as stainless steels. Covering the current collector with a publicly-known protective layer is also allowed.

The current collector is enabled to have such a form as a foil, a sheet, a film, a linear shape, or a rod-like shape. Consequently, as the current collector, a metallic foil, such as a copper foil, a nickel foil, an aluminum foil or a stainless-steel foil, is usable suitably. When the current collector has a foiled, sheeted or filmed form, a preferable thickness thereof falls within a range of from 10 μm to 100 μm.

Making the positive electrode is made possible by forming the active-material layer onto a surface of the current collector.

The active-material layer is permitted to further include a conductive additive. The conductive additive is added in order to enhance the electrically-conducting property of an electrode. As for the conductive additive, the following are exemplified: carbonaceous fine particles, such as carbon black, graphite, acetylene black (or AB) and KETJEN-BLACK (or KB (registered trademark)); and gas-phase-method carbon fibers (or vapor-grown carbon fibers (or VGCF)). One of the conductive additives is addable independently, or two or more thereof are combinable to add to the active-material layer. Moreover, covering the active material with the conductive additive is also allowed. Although an employment amount of the conductive additive is not at all restricted especially, setting the employment amount is possible, for instance, at from one to 50 parts by mass, or at from one to 30 parts by mass, with respect to the active material in an amount of 100 parts by mass.

The active-material layer is permitted to further include a binding agent. The binding agent performs a role of fastening the active material and a conductive additive together onto the surface of a current collector. As for the binding agent, the following are exemplifiable: fluorine-containing resins, such as polyvinylidene fluoride, polytetrafluoroethylene and fluorinated rubber; thermoplastic resins, such as polypropylene and polyethylene; imide-based resins, such as polyimide and polyamide-imide; and alkoxysilyl group-containing resins. Although an employment amount of the binding agent is not at all restricted especially, setting the employment amount is possible at from five to 50 parts by mass with respect to the active material in an amount of 100 parts by mass, for instance.

As for a method of forming an active-material layer onto the surface of a current collector, the active material is permitted to be coated onto a surface of the current collector using a heretofore publicly-known method, such as a roll-coating method, a dip-coating method, a doctor-blade method, a spray-coating method or a curtain-coating method. To be concrete, a composition for forming an active-material layer including the active material, as well as a binding agent and conductive additive, if needed, is prepared. After adding a proper solvent to the composition to turn the composition into a paste-like composition, the composition is coated onto a surface of the current collector, and is thereafter dried thereon. If needed, the post-drying composition is also allowed to be compressed in order to enhance the density of an electrode.

As for the solvent, N-methyl-2-pyrrolidone (or NMP), methanol, and methyl isobutyl ketone (or MIBK) are exemplifiable.

The negative electrode comprises a current collector, and a negative-electrode active-material layer bound together onto a surface of the current collector.

The negative-electrode active-material layer includes a negative-electrode active material, as well as a binding agent and/or a conductive additive, if needed.

The current collector, binding agent and conductive additive are the same as the current collector, binding agent and conductive additive explained in the positive electrode.

As for the negative-electrode active material, the following are exemplifiable: carbon-based materials being capable of occluding and releasing (or sorbing and desorbing) lithium; elements being capable of alloying with lithium; compounds comprising an element being capable of alloying with lithium; or polymeric materials.

As for the carbon-based material, the following are exemplifiable: non-graphitizable carbon, artificial graphite, cokes, graphites, glassy carbons, organic-polymer-compound calcined bodies, carbon fibers, activated carbon, or carbon blacks. Note herein that the "organic-polymer-compound calcined bodies" refer to calcined bodies carbonized by calcining polymeric materials, such as phenols and furans, at a proper temperature.

As for the element being capable of alloying with lithium, the following are exemplifiable concretely: Na, K, Rb, Cs, Fr, Be, Mg, Ca, Sr, Ba, Ra, Ti, Ag, Zn, Cd, Al, Ga, In, Si, Ge, Sn, Pb, Sb, and Bi. In particular, Si, or Sn is preferred.

As for the compound comprising an element being capable of alloying with lithium, the following are exemplifiable concretely: ZnLiAl, AlSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (where $0<"v"\leq2$), $SnO_w$ (where $0<"w"\leq2$), $SnSiO_3$, LiSiO, or LiSnO. In particular, $SiO_x$ (where $0.3\leq"x"\leq1.6$, or $0.5\leq"x"\leq1.5$) is preferred.

Among the options, an allowable negative-electrode active material comprises an Si-based material including Si. A permissible Si-based material comprises silicon or/and a silicon compound being capable of sorbing and desorbing lithium ions. For example, an allowable Si-based material comprises $SiO_x$ (where $0.5\leq"x"\leq1.5$). Although silicon has large theoretical charged and discharged capacities, silicon exhibits large volumetric changes at the time of charging and discharging operations. Hence, making a negative-electrode active material of $SiO_x$ including silicon enables the volumetric changes of silicon to be relieved.

Moreover, a preferable Si-based material has an Si phase, and an $SiO_2$ phase. The Si phase comprises a silicon elementary substance, is a phase being able to sorb and desorb Li ions, and expands and contracts as accompanied by sorbing and desorbing Li ions. The $SiO_2$ phase comprises $SiO_2$, and makes a buffer phase absorbing the expansions and contractions of the Si phase. A more preferable Si-based material comprises the Si phase covered by the $SiO_2$ phase. In addition, an allowable Si-based material comprises a plurality of the pulverized Si phases integrated to form particles by being covered with the $SiO_2$ phase. In the instance, the volumetric changes of the entire Si-based material are suppressible effectively.

A preferable mass ratio of the $SiO_2$ phase to the Si phase in the Si-based material is from one to three. When the mass ratio is less than one, the expansions and contractions of the Si-based material become large, and so such a fear probably arises that cracks occur in the negative-electrode active-material layer including the Si-based material. On the other hand, when the mass ratio exceeds three, the Li-ion sorbing and desorbing amounts of the negative-electrode active material become less, and so the electric capacitance of a battery per the negative-electrode unit mass becomes low.

Moreover, as the compound comprising an element capable of undergoing an alloying reaction with lithium, tin compounds, such as tin alloys (e.g., Cu—Sn alloys, Co—Sn alloys, and the like), are exemplifiable.

As for the polymeric material, polyacetylene, and polypyrrole are exemplifiable concretely.

The separator is one of the constituent elements making lithium ions pass therethrough while isolating the positive electrode and negative electrode from one another and preventing the two electrodes from contacting one another to result in electric-current short-circuiting. As for the separator, the following are exemplifiable, for instance: porous membranes using one member or a plurality of synthetic resins, such as polytetrafluoroethylene, polypropylene or polyethylene; or porous membranes made of ceramics.

The electrolytic solution includes a nonaqueous solvent, and an electrolyte dissolved in the nonaqueous solvent.

As for the nonaqueous solvent, cyclic esters, linear or chain-shaped esters, ethers, and the like, are employable. As for the cyclic esters, the following are exemplifiable: ethylene carbonate, propylene carbonate, butylene carbonate, gamma-butyrolactone, vinylene carbonate, 2-methyl-gamma-butyrolactone, acetyl-gamma-butyrolactone, and gamma-valerolactone. As for the linear esters, the following are exemplifiable: dimethyl carbonate, diethyl carbonate, dibutyl carbonate, dipropyl carbonate, methyl ethyl carbonate, alkyl propionate ester, dialkyl malonate ester, alkyl acetate ester, and so forth. As for the ethers, the following are exemplifiable: tetrahydrofuran, 2-methyltetrahydrofuran, 1,4-dioxane, 1,2-dimethoxyethane, 1,2-diethoxyethane, and 1,2-dibutoxyethane.

As for the electrolyte, a lithium salt, such as $LiClO_4$, $LiAsF_6$, $LiPF_6$, $LiBF_4$, $LiCF_3SO_3$ or $LiN(CF_3SO_2)_2$, is exemplifiable.

As for the electrolytic solution, the following solution is exemplifiable: a solution comprising a lithium salt, such as $LiClO_4$, $LiPF_6$, $LiBF_4$ or $LiCF_3SO_3$, dissolved in a concentration of from 0.5 mol/L to 1.7 mol/L approximately in a nonaqueous solvent, such as ethylene carbonate, dimethyl carbonate, propylene carbonate or diethyl carbonate.

A lithium-ion secondary battery according to the present invention is less likely to degrade, and exhibits a suitable capacity maintained rate, because the present lithium-ion secondary battery comprises: the stable high manganese portion on a surface of the core portion acting as an active material; and further comprises the metallic oxidation portion protecting the high manganese portion. As a consequence, the present lithium-ion secondary battery is able to exhibit a satisfactory capacity maintained rate even under a high-potential driving or operating condition. Consequently, the present lithium-ion secondary battery is a battery maintaining large charged and discharged capacities and having excellent cyclic performance. Note herein that the "high-potential driving or operating condition" refers to conditions where a lithium-ion operating potential to lithium metal is 4.3 V or more, and is further from 4.4 V to 4.6 V or from 4.5 V to 5.5 V. In the present lithium-ion secondary battery, setting a charging potential of the positive electrode is possible at 4.3 V or more, and further at from 4.4 V to 4.6 V or from 4.5 V to 5.5 V, to lithium metal serving as the standard. Note that, in the driving or operating condition of a common lithium-ion secondary battery, a lithium-ion operating potential to lithium metal is less than 4.3 V.

Since a type of the present lithium-ion secondary battery is not at all limited especially, various types, such as cylindrical types, rectangular types, coin types and laminated types, are adoptable.

The present lithium-ion secondary battery is mountable in a vehicle. Since the present lithium-ion secondary battery maintains large charged and discharged capacities and has excellent cyclic performance, the vehicle having the battery on-board makes a high-performance vehicle.

As for the vehicle, an allowable vehicle is a vehicle making use of electric energies produced by battery for all or some of the power source. For example, the following are given: electric automobiles, hybrid automobiles, plug-in hybrid automobiles, hybrid railroad vehicles, electric-powered forklifts, electric wheelchairs, electric-power-assisted bicycles, and electric-powered two-wheel vehicles.

Having been described so far are the embodiment modes of the present invention. However, the present invention is not limited to the aforementioned embodying modes at all. The present invention is feasible in various modes, to which changes or modifications that one of ordinary skill in the art carries out are made, within a range not departing from the gist of the present invention.

EXAMPLES

Hereinafter, examples and comparative examples are shown to describe the present invention more concretely. Note that the examples in the following descriptions do not limit the present invention at all. In the following descriptions, the term, "part," means a part by mass, and the term, "%," means a percentage by mass, unless otherwise specified especially.

First Example

A lithium composite metallic oxide according to a first example was produced as described below.

A first aqueous solution of which the molar ratio between nickel, cobalt and manganese was 6:2:2 was prepared by dissolving nickel sulfate, cobalt sulfate and manganese sulfate into water. In the first aqueous solution, a summed concentration of nickel, cobalt and manganese was 0.9 mol/L.

A second aqueous solution of which the molar ratio between nickel, cobalt and manganese was 4:2:4 was prepared by dissolving nickel sulfate, cobalt sulfate and manganese sulfate into water. In the second aqueous solution, a summed concentration of nickel, cobalt and manganese was 0.9 mol/L.

Water was put into a reaction vessel equipped with a stirring apparatus and nitrogen introduction tube, and was then heated to 40° C. while keeping the water stirring. Nitrogen was kept to be supplied through the nitrogen introduction tube to maintain the reaction vessel under a nitrogen atmosphere. 16%-by-mass sodium hydroxide aqueous solution, and 28%-by-mass ammonia aqueous solution were supplied into the reaction vessel to prepare a basic aqueous solution of which the ammonia concentration was 9 g/L and the pH was 11.6. Note that the pH prescribed in the present specification is a value when measured at 25° C., as described above.

To the basic aqueous solution put under a stirring condition at a speed of 1,000 rpm, the first aqueous solution and second aqueous solution were supplied simultaneously. A supplying speed of the first aqueous solution and second aqueous solution was 0.4 mL/min. Moreover, in order to maintain the ammonia concentration of the basic aqueous solution at 9 g/L approximately and the pH of the basic aqueous solution at from 11.6 to 11.8 approximately, 16%-by-mass sodium hydroxide aqueous solution and 3%-by-mass ammonia aqueous solution were supplied appropriately into the reaction vessel. Thus, first primary particles including nickel, cobalt and manganese in such a molar ratio as 6:2:2, and second primary particles including nickel, cobalt and manganese in such a molar ratio as 4:2:4 were formed.

An amount of the mixed aqueous solution in the reaction vessel was reduced, and the stirring operation was kept going to form combined particles, in which the first primary particles and second primary particles were combined with each other, while maintaining the ammonia concentration of the mixed aqueous solution at 9 g/L approximately and the pH of the mixed aqueous solution at from 11.2 to 11.3 approximately. The amount of the mixed aqueous solution was reduced again after filtering the combined particles, and then the filtered combined particles were charged into the mixed aqueous solution to grow the combined particles. Post-growth combined particles were isolated by filtration, and then washed with water. Post-washing combined particles were heated at 300° C. for 20 hours to dehydrate the combined particles.

Post-dehydration combined particles, and lithium carbonate were mixed so as to make such a molar ratio as 1.1:1 between lithium and a sum of nickel, cobalt and manganese to obtain a mixture. To the mixture, zirconium phosphate serving as a doping element "D"-containing compound was added in an amount of 0.5% by mass, and was admixed therewith. To the thus obtained mixture, a primary calcining operation was carried out under such conditions at 650° C. for 10 hours. Subsequently, a secondary calcining operation was carried out under such conditions at 850° C. for five hours to obtain a calcined substance. After cooling the calcined substance, a pulverizing operation and classifying operation were carried out to the cooled calcined substance to obtain a metallic oxide material of which the average particle diameter was 6 μm. The metallic oxide material had an average composition expressed by $Li_{1.13}Ni_{4.97/10}Co_{1.99/10}Mn_{2.98/10}Zr_{0.05/10}O_2$. The metallic oxide material was labeled a metallic oxide material according to a first example.

Aforementioned Treatment 5 was followed to carry out the following surface modification to the aforementioned metallic oxide material.

As an aqueous solution for surface modification, a manganese pyrophosphate aqueous solution including manganese pyrophosphate in an amount of 0.4% by mass was readied. After mixing the manganese pyrophosphate aqueous solution with the aforementioned metallic oxide material, the manganese pyrophosphate aqueous solution and metallic oxide material were stirred at room temperature for one hour. After the stirring operation, a lithium composite metallic oxide was filtered to isolate. Subsequently, the lithium composite metallic oxide was dried at 130° C. for six hours. The post-drying lithium composite material was heated at 700° C. under an atmospheric atmosphere for five hours. A product obtained by the treatments was labeled a lithium composite metallic oxide according to the first example. The lithium composite metallic oxide had an average composition expressed by $Li_{1.13}Ni_{4.97/10}Co_{1.99/10}Mn_{2.98/10}Zr_{0.05/10}O_2$, in the same manner as the aforementioned metallic oxide material.

Second Example

Other than using, as the aqueous solution for surface modification, a manganese pyrophosphate aqueous solution including manganese pyrophosphate in an amount of 0.8% by mass, a lithium composite metallic oxide according to a second example was obtained by the same method as described in the first example.

Third Example

Other than using, as the aqueous solution for surface modification, a manganese pyrophosphate aqueous solution including manganese pyrophosphate in an amount of 12.6% by mass, a lithium composite metallic oxide according to a third example was obtained by the same method as described in the first example.

First Comparative Example

Other than using, as the metallic oxide material, commercially available $Li_{1.1}Ni_{5/10}Co_{2/10}Mn_{3/10}O_2$ in which no zirconium was doped, a lithium composite metallic oxide according to a first comparative example was obtained by the same method as described in the first example.

Second Comparative Example

Commercially available $Li_{1.1}Ni_{5/10}Co_{2/10}Mn_{3/10}O_2$ to which no surface modification was carried out was labeled a lithium composite metallic oxide according to a second comparative example.

Fourth Example

A lithium-ion secondary battery according to a fourth example was fabricated in the following manner.

A positive electrode was made as described below.

An aluminum foil with a thickness of 20 μm was readied to serve as a current collector for positive electrode. The following were mixed each other: the lithium composite metallic oxide according to the first example serving as an active material in an amount of 94 parts by mass; acetylene black serving as a conductive additive in an amount of three parts by mass; and polyvinylidene fluoride (or PVdF) serving as a binder in an amount of three parts by mass. The mixture was dispersed in a proper amount of N-methyl-2-pyrrolidone (or NMP) to prepare a slurry. The aforementioned slurry was put on a surface of the aforementioned aluminum foil, and then the slurry was coated thereon so as to be in the shape of a film using a doctor blade. The NMP was removed to form an active-material layer on the aluminum-foil surface by means of volatilization by drying the aluminum foil with the slurry coated at 80° C. for 20 minutes. The aluminum foil with the active-material layer formed on the surface was compressed using a roll pressing machine to adhesion join the aluminum foil and the active-material layer firmly with one another. The joined substance was heated at 120° C. for six hours with a vacuum drier, and was then cut out to a predetermined configuration (e.g., a rectangular shape with 25 mm×30 mm) to obtain a positive electrode.

A negative electrode was made as described below.

The following were mixed each other: carbon-coated $SiO_x$ (where $0.3 \leq \text{"x"} \leq 1.6$) in an amount of 32 parts by mass; graphite in an amount of 50 parts by mass; acetylene black serving as a conductive additive in an amount of 8 parts by mass; and polyamide-imide serving as a binding agent in an amount of 10 parts by mass. The mixture was dispersed in a proper amount of ion-exchanged water to prepare a slurry. The slurry was coated onto a copper foil with a thickness of 20 μm (i.e., a current collector for negative electrode) so as to be in the shape of a film using a doctor blade. The copper foil with the slurry coated thereon was dried, and was thereafter pressed. The joined substance was heated at 120° C. for six hours with a vacuum drier, and was then cut out to a predetermined configuration (e.g., a rectangular shape with 25 mm×30 mm) to make a negative electrode with a thickness of 85 μm approximately.

Using the above-mentioned positive electrode and negative electrode, a laminated-type lithium-ion secondary battery was manufactured. To be concrete, a rectangle-shaped sheet serving as a separator and comprising a polypropylene/polyethylene/polypropylene three-layered-construction resinous film with 27×32 mm in size and 25 μm in thickness was interposed or held between the positive electrode and the negative electrode to make a polar-plate subassembly. After covering the polar-plate subassembly with laminated films in which two pieces made a pair and then sealing the laminated films at the three sides, an electrolytic solution was injected into the laminated films which had been turned into a bag shape. As for the electrolytic solution, a solution was used: the solution comprised a solvent in which ethylene carbonate, methyl ethyl carbonate, and diethyl carbonate had been mixed with each other in such a volumetric ratio as 3:3:4; and $LiPF_6$ dissolved in the solvent so as to make 1 mol/L. Thereafter, the remaining one side was sealed to obtain a laminated-type lithium-ion secondary battery according to the fourth example in which the four sides were sealed air-tightly and in which the polar-plate subassembly and electrolytic solution were closed hermetically. Note that the positive electrode and negative electrode were equipped with a tab connectable electrically with the outside, respectively, and the tabs extended out partially to the outside of the laminated-type lithium-ion secondary battery.

Via the above steps, the laminated-type lithium-ion secondary battery according to the fourth example was fabricated.

Fifth Example

Other than using, as the active material, the lithium composite metallic oxide according to the second example, a lithium-ion secondary battery according to a fifth example was fabricated by the same method as described in the fourth example.

Sixth Example

Other than using, as the active material, the lithium composite metallic oxide according to the third example, a lithium-ion secondary battery according to a sixth example was fabricated by the same method as described in the fourth example.

Third Comparative Example

Other than using, as the active material, the lithium composite metallic oxide according to the first comparative example, a lithium-ion secondary battery according to a third comparative example was fabricated by the same method as described in the fourth example.

Fourth Comparative Example

Other than using, as the active material, the lithium composite metallic oxide according to the second comparative example, a lithium-ion secondary battery according to a fourth comparative example was fabricated by the same method as described in the fourth example.

First Evaluative Example

First Analysis on Metallic Oxide Material

Figure 5:
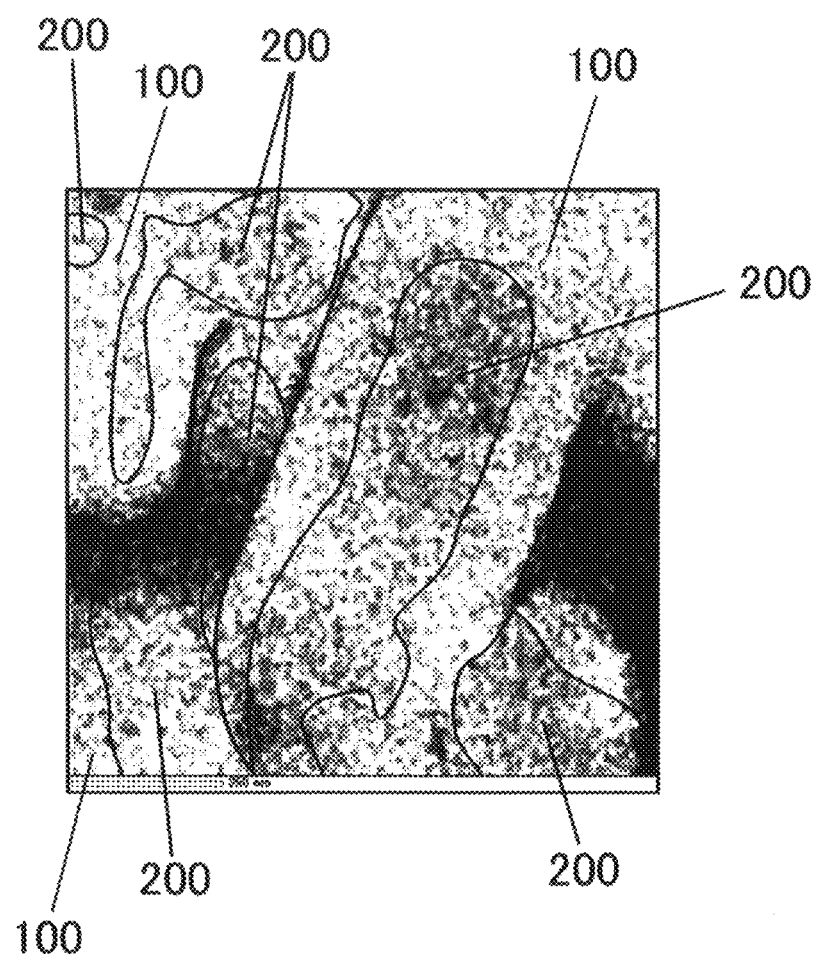
FIG. 5 is a diagram giving the classifications between respective composition portions to a photograph in which an STEM-EDX image of a metallic oxide material according to a first example and an elemental map of Ni, Co and Mn thereof are superimposed.

As to the metallic oxide material according to the first example, an analysis for identifying the first-composition portion and second-composition portion was carried out while aiming at Ni, Co and Mn, or at Ni, Co, Mn and Zr, as the measuring objects, using an STEM-EDX, a combination of a scanning transmission-type electron microscope and an energy dispersion-type X-ray spectroscopic analyzing device. FIG. 5 illustrates a diagram in which distinctions between the first-composition portion and the second-composition portion were made to the superimposition of an image obtained by the STEM-EDX and an elemental map of Ni, Co and Mn. In FIG. 5, "100"s designate the first-composition portion, and "200"s designates the second-composition portion.

As to the respective dots of the first-composition portion and second-composition portion in FIG. 5, an analysis was carried out while aiming at Ni, Co, Mn and Zr as the measuring objects. Table 2 shows obtained metallic-atom composition ratios (%).

TABLE 2

|    | First-Composition Portion | Second-Composition Portion |
|----|---------------------------|----------------------------|
| Ni | 50.70                     | 47.17                      |
| Co | 19.50                     | 18.40                      |
| Mn | 29.22                     | 34.37                      |
| Zr | 0.58                      | 0.06                       |

From the results shown in Table 2, Zr was found out to be doped more in the first-composition portion.

The reason is believed to lie in relevancy between the valences of the metallic elements constituting the composition portions (i.e., the host materials) to be subjected to doping and the valence of the doping metallic element. To be concrete, of Ni, Co and Mn, which are the metallic elements in the aforementioned first-composition portion and second-composition portion, Ni is likely to turn divalent or trivalent, Co is likely to turn trivalent, and Mn is likely to turn tetravalent, respectively; whereas Zr, the doping element, is likely to turn tetravalent. Note herein an "environment in a host material in which a metallic element having a tetravalent electric charge is likely to be doped" is believed to be a state where a host-material metallic element having an identical tetravalent electric charge, namely, Mn does not exist excessively, and where a metallic element, which is capable of adjusting the electric charges of the metallic elements in the entire host material, exists sufficiently when the metallic element having a tetravalent electric charge is doped in the host material; namely, Ni, which is capable of adjusting the electric charges (i.e., valences) of the metallic elements in the entire host material, to trivalent, exists sufficiently when tetravalent Zr is doped. Note that Ni is capable of turning from trivalent to divalent, as described above. Hence, compared with the second-composition portion, the first-composition portion of which the Mn composition ratio is low relatively and the Ni composition ratio is sufficiently greater than the Mn composition ratio relatively is believed to have crystals into which Zr, the doping element possessing a tetravalent electric charge, is likely to intrude.

Second Evaluative Example

First Analysis on Lithium Composite Metallic Oxide

As to the lithium composite metallic oxide according to the first example, an analysis was carried out by the same method as described in the first evaluative example while aiming at Ni, Co, Mn and Zr as the measuring objects. Table 3 shows the thus obtained metallic-atom composition ratios (%).

TABLE 3

|    | First-Composition Portion | Second-Composition Portion |
|----|---------------------------|----------------------------|
| Ni | 50.13                     | 45.85                      |
| Co | 20.86                     | 18.22                      |
| Mn | 28.71                     | 35.86                      |
| Zr | 0.31                      | 0.07                       |

From the results shown in Table 3, the existences of the first-composition portion and second-composition portion were ascertainable in the surface-modified lithium composite metallic oxide as well.

Third Evaluative Example

Second Analysis on Metallic Oxide Material

Figure 6:
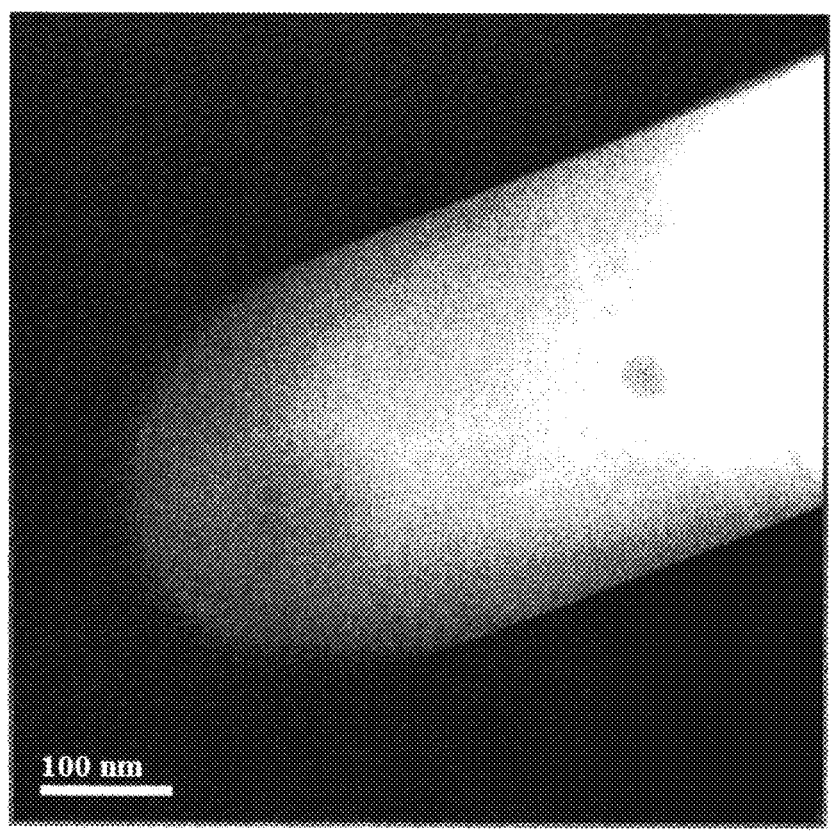
FIG. 6 is an HAADF-STEM image of the metallic oxide material according to the first example.

As to the active-material primary particles in the metallic oxide material according to the first example, a cross section was formed by an Ar-ion milling method using an ion slicer (e.g., "EM-09100IS" produced by JEOL Ltd.), and then the formed cross section was measured at an acceleration voltage of 200 kV while carrying out a spherical aberration correction, using a high-angle scattering annular dark-field scanning transmission electron microscope (or HAADF-STEM)/"JEM-ARM200F" produced by JEOL Ltd. FIG. 6 illustrates an obtained HAADF-STEM image. In the HAADF-STEM image shown in FIG. 6, no crystal grain boundaries, which exhibited varying crystal orientations, were observed.

Figure 7:
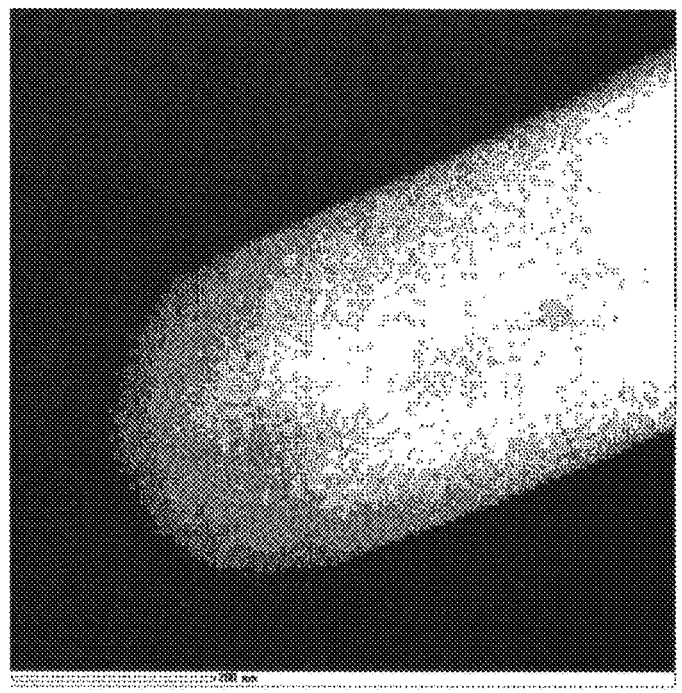
FIG. 7 is a diagram in which the HAADF-STEM image of the metallic oxide material according to the first example and an elemental map of Co and Mn thereof obtained by an STEM-EDX are superimposed.
Figure 8:
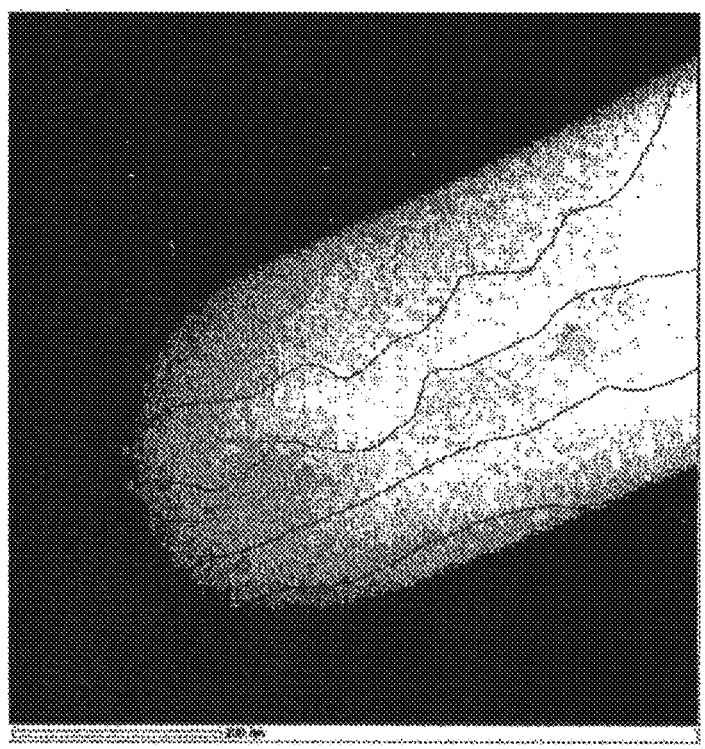
FIG. 8 is a diagram in which the HAADF-STEM image of the metallic oxide material according to the first example and the elemental map of Co and Mn thereof obtained by the STEM-EDX are superimposed, and in which the respective composition portions are further classified with the continuous lines.

To a cross section of the same active-material primary particles, an analysis was carried out while aiming at Co and Mn as the measuring objects, using an STEM-EDX, a combination of a scanning transmission-type electron microscope and an energy dispersion-type X-ray spectroscopic analyzing device. FIG. 7 illustrates a diagram in which an elemental map of Co and Mn, and the aforementioned HAAD-STEM image were superimposed. Moreover, FIG. 8 illustrates a diagram in which the respective composition portions were demarcated from one another with the solid lines. In FIG. 8, the composition portions demarcated from one another with the solid lines appear from up above in the following order: the second-composition portion, the first-composition portion, the second-composition portion, the first-composition portion, and the second-composition portion.

Figure 9:
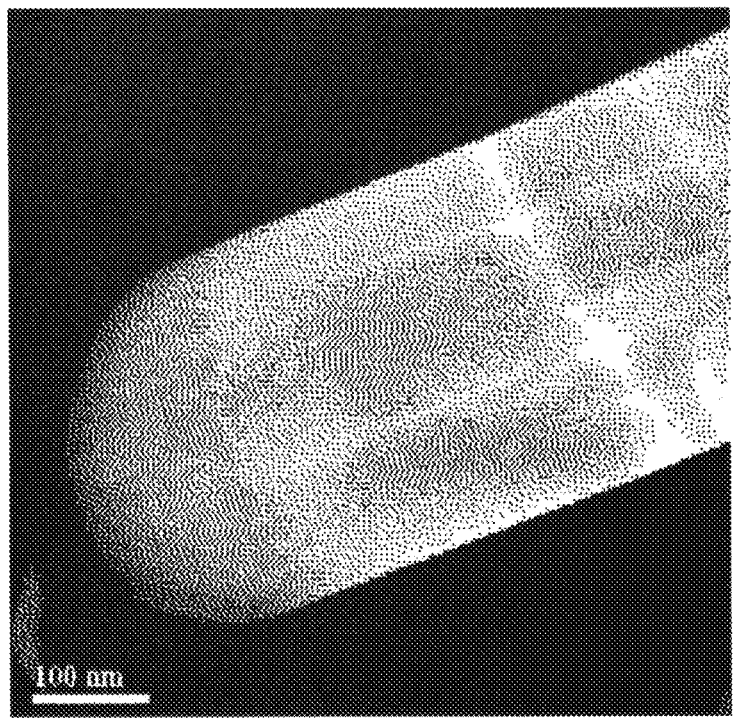
FIG. 9 is an LAADF-STEM image of the metallic oxide material according to the first example.

A cross section of the same active-material primary particles as mentioned above was measured by a low-angle scattering annular dark-field scanning transmission electron microscope (or LAADF-STEM). An LAADF-STEM image is capable of visualizing strains or distortions in crystals, because the LAADF-STEM image displays diffraction contrasts vividly, compared with an HAADF-STEM image. FIG. 9 illustrates an obtained LAADF-STEM image. In FIG. 9, white lines, which were not observed in FIG. 6, were observed. The white-line site or location, which crosses the center of the particle, corresponds to an interfacial site or location between the second-composition portion and the first-composition portion.

Figure 10:
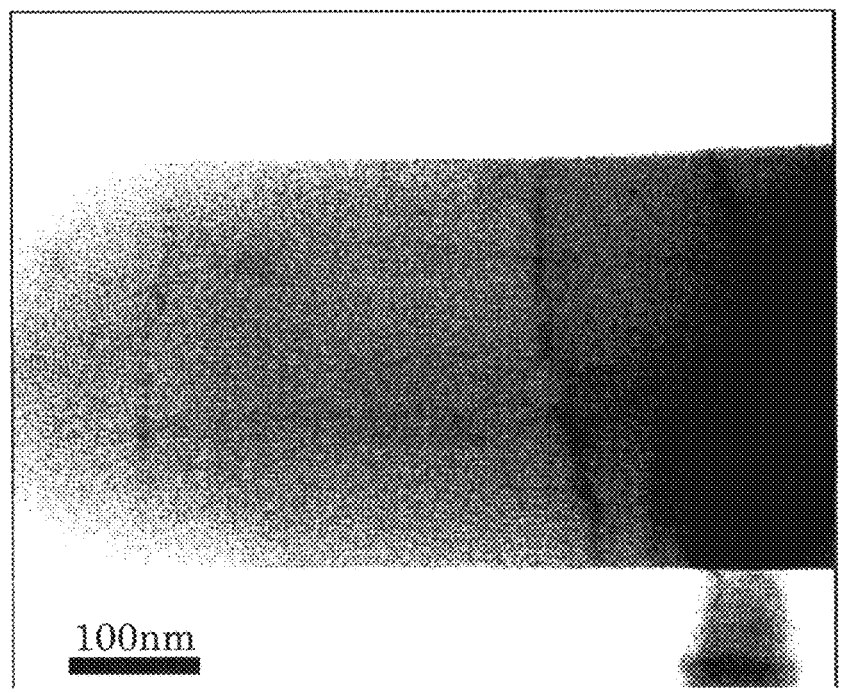
FIG. 10 is a BF-STEM image of the metallic oxide material according to the first example.

A cross section of the same active-material primary particles as mentioned above was measured by a bright-field scanning transmission electron microscope (or BF-STEM). FIG. 10 illustrates an obtained BF-STEM image. In the BF-STEM image shown in FIG. 10, the vertical direction is a <0001> orientation, and the horizontal direction is an <11-20> orientation. Note that, in the designation, <11-20>, "–2" specifies "2" with an upper bar put thereon. Since the image shown in FIG. 10 and the image shown in FIG. 9 are in an inversion relation to one another, the white lines, which has been observed in FIG. 9 for the first time, are observed as the black lines in FIG. 10.

Figure 11:
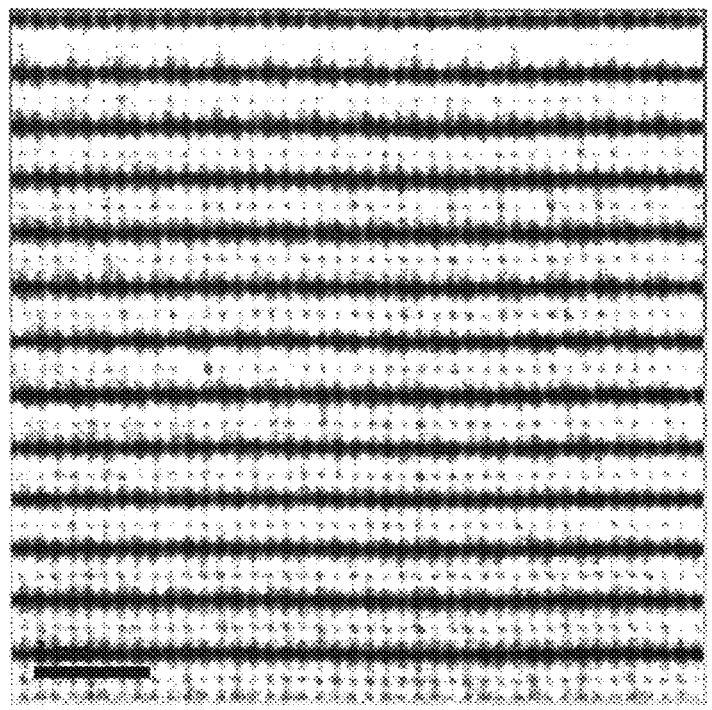
FIG. 11 is an ABF-STEM image of an interfacial site or location between a second-composition portion and a first-composition portion in the metallic oxide material according to the first example.

Following the above, one of the black-line sites or locations, which cross the middle in the BF-STEM image shown in FIG. 10, was measured by an annular bright-field scanning transmission electron microscope (or ABF-STEM). The black-line site or location corresponds to an interfacial site or location between the second-composition portion and the first-composition portion. FIG. 11 illustrates an obtained ABF-STEM image. As an object for comparison, FIG. 12 illustrates an ABF-STEM image in which the first-composition portion was measured at around the middle by an annular bright-field scanning transmission electron microscope.

Figure 12:
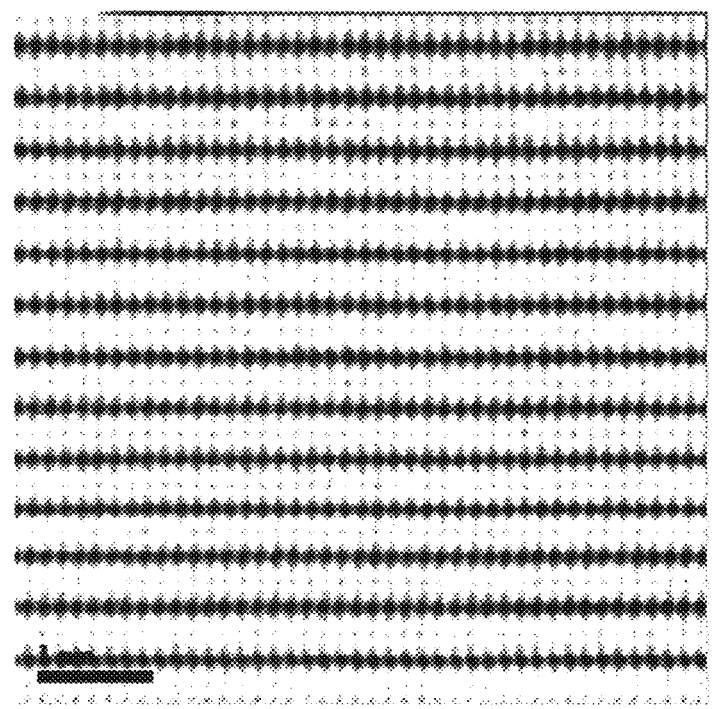
FIG. 12 is an ABF-STEM image of the first-composition portion in the metallic oxide material according to the first example.

In FIG. 11 and FIG. 12, the respective spots designate elements, and the horizontal spot layers designate elemental layers. Moreover, the darkest black-spot layers designate transition metal layers. The respective images shown in FIG. 11 and FIG. 12 prove that the layers are repeated regularly in the vertical direction in the following order; starting at a transition metal layer, namely, one of the darkest black-spot layers, and then followed by an oxygen layer, a lithium layer, another oxygen layer and another transition metal layer. Comparing FIG. 11 with FIG. 12 at length proves that the layers constituted of the respective elements are arranged linearly without any disturbance in FIG. 12, whereas the layers shown in FIG. 11 have a very slight disturbance in the arrangement. However, no marked boundary is observed in the cyclic elemental arrangement shown in FIG. 11, although the layers are parts at which the compositions switch as confirmed by FIG. 7 and FIG. 8. The fact signifies that the image shown in FIG. 11 have a single crystal structure. That is, the fact signifies that the interfacial site or location between the first-composition portion and the second-composition portion in the active-material primary particles is a site or location which hardly produces any difference virtually from the other sites or locations from a viewpoint of the crystal lattice, and at which only the compositions of the transition metals switch. Since no image showing the boundary between the crystals is observed in FIG. 11, the lines, which has been observed newly in FIG. 9 and FIG. 10 and which result from the diffraction contrasts, are not believed to be lines which designate any crystal particle, but are believed to be the very slight disturbance in the active-material primary particles, disturbance which has turned into the observed images. The cause is presumed to be attributable to strains or distortions which arise due to the switching compositions.

The results shown in FIG. 6 through FIG. 12 supported the following facts: the active-material primary particles, which comprise the first-composition portion and second-composition portion in the metallic oxide material, have a single-crystal structural body which exhibits such a state as if being a single crystal, although the active-material primary particles have sites or locations at which the compositions differ partially each other.

Moreover, to a cross section of the active-material primary particles, an analysis was carried out while aiming at Zr as the measuring object, using an STEM-EDX. As a result, Zr was ascertainable to exist in a high concentration on a side of the superficial layer of the particles, compared with the concentration on a side of the interior.

Fourth Evaluative Example

Second Analysis on Lithium Composite Metallic Oxide

Figure 13:
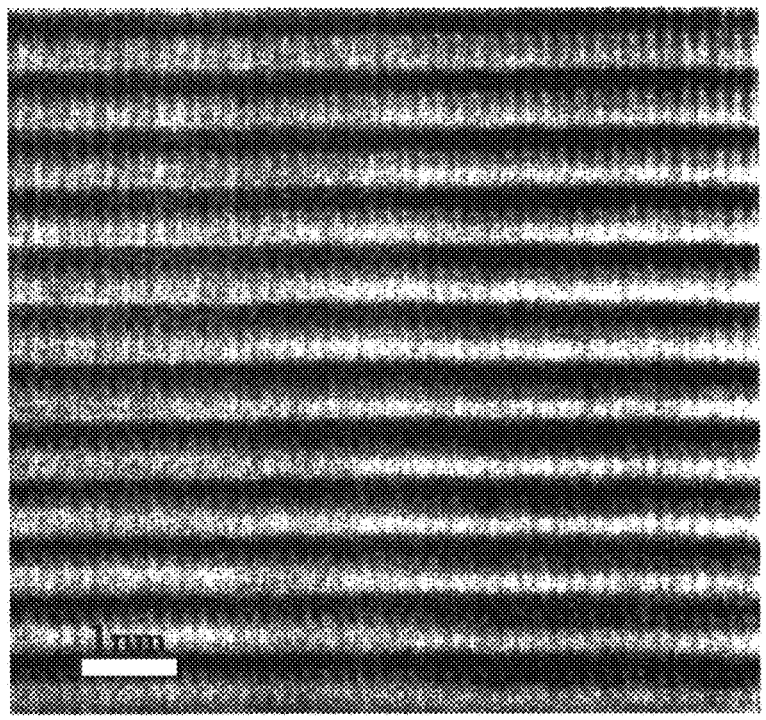
FIG. 13 is an ABF-STEM image of an interfacial site or location between a second-composition portion and a first-composition portion in a lithium composite metallic oxide according to the first example.

A cross section of the lithium composite metallic oxide according to the first example was measured with a BF-STEM by the same method as described in the third evaluative example. Subsequently, an interfacial site or location between the second-composition portion and the first-composition portion in an obtained BF-STEM image was measured with an ABF-STEM. FIG. 13 illustrates an obtained ABF-STEM image. As an object for comparison, FIG. 14 illustrates an ABF-STEM image in which the first-composition portion was measured at around the middle with the ABF-STEM.

Figure 14:
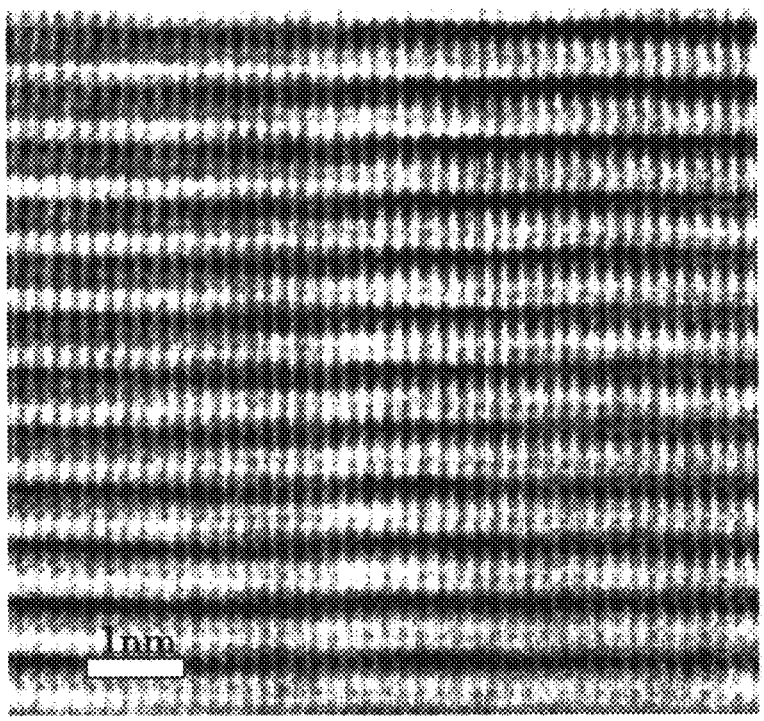
FIG. 14 is an ABF-STEM image of the first-composition portion in the lithium composite metallic oxide according to the first example.

Observing FIG. 13 and FIG. 14 revealed that the two images exhibit an identical crystal structure, although the two images have different light/dark ratios and definitions. The observation supported the following facts: the active-material primary particles, which comprise the first-composition portion and second-composition portion in the lithium composite metallic oxide, have a single-crystal structural body which exhibits such a state as if being a single crystal in the same manner as the metallic oxide material (i.e., the precursor), although the active-material primary particles have sites or locations at which the compositions differ partially each other.

Fifth Evaluative Example

Third Analysis on Lithium Composite Metallic Oxide

Figure 15:
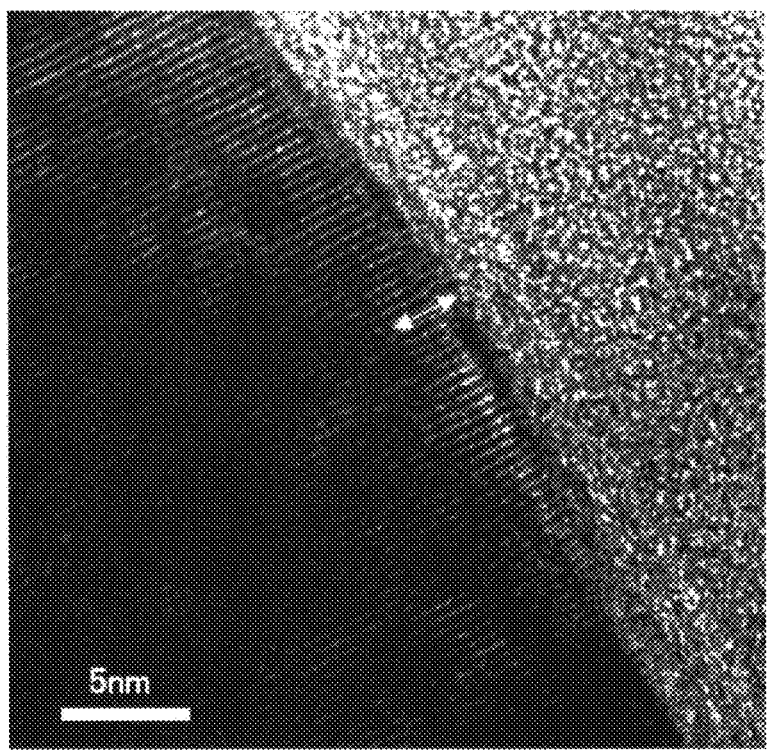
FIG. 15 is a TEM image of a cross section in the lithium composite metallic oxide according to the first example.

As to the lithium composite metallic oxide according to the first example, a cross section was formed by an Ar-ion milling method using an ion slicer (e.g., "EM-09100IS" produced by JEOL Ltd.). Then, an analysis was carried out to the formed cross section while aiming at Ni, Co and Mn as the measuring objects, using a TEM-EDX. As a result, the following became evident: the Mn composition ratio falling in a range of from a surface of the lithium composite metallic oxide to about 3 nm was high, compared with the composition ratio in the interior (or the core portion). Saying is possible that the high manganese portion exists in a range of from a surface of the lithium composite metallic oxide to about 3 nm. FIG. 15 illustrates an obtained TEM image. A boundary line, which is observed to extend from the top of FIG. 15 to the lower right, corresponds to a surface site or location of the lithium composite metallic oxide, and a left side, which lies more leftward than does the boundary line, corresponds to the lithium composite metallic oxide. In FIG. 15, a layer, which falls in a range of the double-headed arrow in the vicinity of the aforementioned boundary line, corresponds to the high manganese portion.

Figure 16:
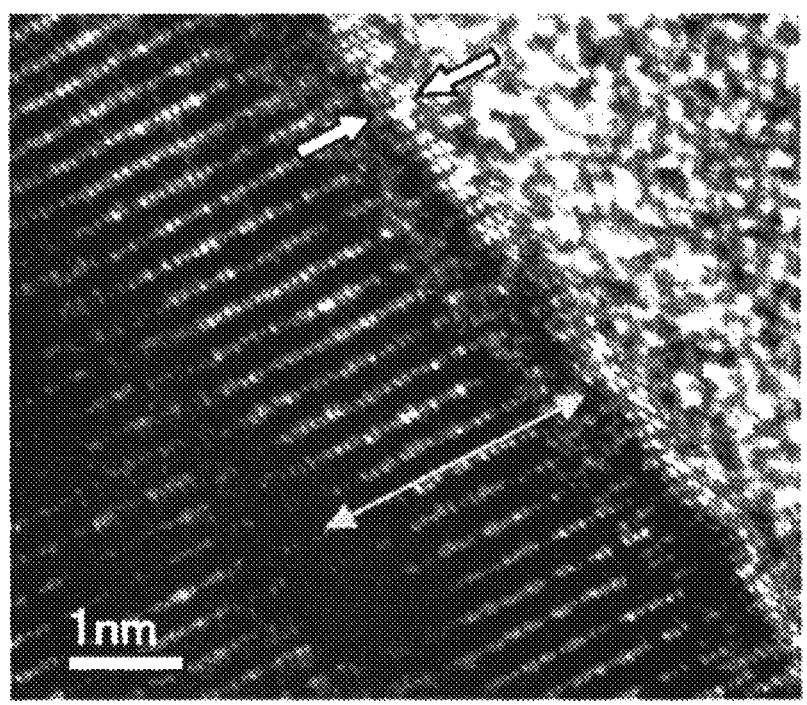
FIG. 16 is a high-resolution TEM image of the cross section in the lithium composite metallic oxide according to the first example.

Next, the aforementioned cross section was measured at around the surface site or location by a high-resolution TEM. Then, a crystal-state layer, which was different from the core portion and high manganese portion, became evident to exist with a width of from 0.5 to 0.7 nm approximately in the outermost surface. That is, the metallic oxidation portion became evident to exist lamellarly. FIG. 16 illustrates an obtained high-resolution TEM image. In FIG. 16, a layer, which falls in a range held or interposed between the two upper double-headed arrows, corresponds to the metallic oxidation portion, and another layer, which falls in another range of the other double-headed arrow at around the middle down below, corresponds to the high manganese portion.

Figure 17:
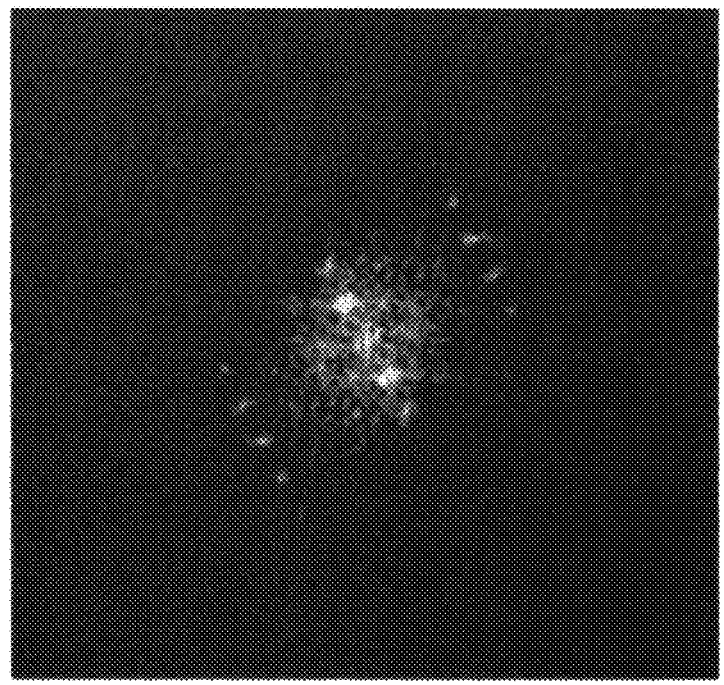
FIG. 17 is an FFT profile of a high manganese portion in the lithium composite metallic oxide according to the first example.
Figure 18:
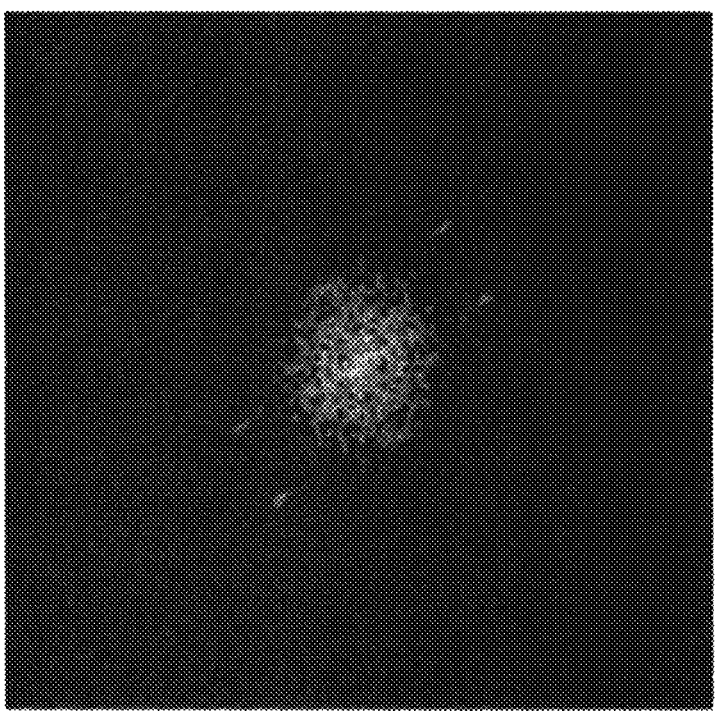
FIG. 18 is an FFT profile of a metallic oxidation portion in the lithium composite metallic oxide according to the first example.

Moreover, electron-beam diffraction patterns of the high manganese portion and metallic oxidation portion were obtained by a high-resolution TEM, and were then subjected to a fast-rate Fourier transformation to obtain an FFT profile, respectively. FIG. 17 illustrates the FFT profile of the high manganese portion, whereas FIG. 18 illustrates the FFT profile of the metallic oxidation portion. Since each of the FFT profiles exhibited a distinct diffraction patterns to one another, the two were supported to have independent crystal structures to one another.

In addition, when the metallic oxidation portion was subjected to a TEM-EDX analysis, the metallic oxidation portion became evident to have equivalent Ni and Co composition ratios, a slightly high Mn composition ratio and a slightly low oxygen composition ratio, compared with the high manganese portion.

When analyses were carried out as to the lithium composite metallic oxide according to the third example in the same manner as aforementioned, the Mn composition ratio became evident to be high in a range of from a surface of the lithium composite metallic oxide to about 15 nm, compared with the composition ratio in the interior. Hence, saying is possible that the high manganese portion exists in a range of from a surface of the lithium composite metallic oxide to about 15 nm. Moreover, the metallic oxidation portion became evident to exist with a range of from three to five nm approximately in an outermost surface. However, no regular crystal state was observed in the metallic oxidation portion. In addition, when the electron-beam diffraction patterns of the core portion, high manganese portion and metallic oxidation portion which were obtained by a high-resolution TEM were subjected to a fast Fourier transformation, respectively, to obtain FFT profiles, the core portion and high manganese portion were supported to be crystalline, because the FFT profiles of the core portion and high manganese portion were profiles which showed a specific or definite diffraction pattern, respectively. However, the metallic oxidation portion was supported to be amorphous, because no diffraction pattern was observed from the FFT profile of the metallic oxidation portion.

Sixth Evaluative Example

Evaluation on Lithium-ion Secondary Battery

Initial capacities of the laminated-type lithium-ion secondary batteries according to the fourth through sixth examples and the third and fourth comparative examples were measured. A discharged capacity was measured when carrying out a CC discharging (i.e., constant-current discharging) mode or operation to each of the batteries to be measured at a rate of 0.33 C with a voltage of 3.0 V for five hours after carrying out a CCCV charging (i.e., constant-current and constant-voltage charging) mode or operation was carried out to each of the batteries at 25° C. at a rate of 1 C with a voltage of 4.5 V. The thus measured discharged capacities were labeled the initial capacities.

Next, a charging mode or operation was carried out to each of the batteries to be measured up to a voltage of 4.32 V at a rate of 1 C at 60° C. Then, the batteries were preserved at 60° C. for six days. After the preservation, the batteries were left at room temperature for five hours or more. Thereafter, the discharged capacities were measured under the same conditions as the conditions for the measurement of the initial capacities. The thus measured discharged capacities were labeled the post-six-day preserved capacities.

Moreover, a charging mode or operation was carried out again to each of the batteries preserved for six days to a voltage of 4.32 V at a rate of 1 C at 60° C. Then, the batteries were further preserved at 60° C. for extra six days. After the preservation, the batteries were left at room temperature for five hours or more. Thereafter, the discharged capacities were measured under the same conditions as the conditions for the measurement of the initial capacities. The thus measured discharged capacities were labeled the post-12-day preserved capacities.

In addition, the identical preservations and measurements were further carried out twice to each of the batteries to obtain the post-18-day preserved capacity and the post-24-day preserved capacity, respectively.

A capacity maintained rate (%) were found by the following equation.

Capacity Maintained Rate (%)={(Post-preservation Capacity)/(Initial Capacity)}×100

Note that 1 C refers to a current rate at which a battery is discharged for one hour, for instance.

Table 4, and Table 5 show results of the above.

TABLE 4

| | Doping Element | Metallic Salt Concentration in Aqueous Solution for Surface Modification | Initial Capacity (mAh/g) |
|---|---|---|---|
| 4th Ex. | Present | 0.4% by Mass | 143.4 |
| 5th Ex. | Present | 0.8% by Mass | 149.3 |
| 6th Ex. | Present | 12.6% by Mass | 120.3 |
| 3rd Comp. Ex. | None | 0.4% by Mass | 150.1 |
| 4th Comp. Ex. | None | No Surface Modification Done | 150.0 |

TABLE 5

| | Capacity Maintained Rate | | | |
|---|---|---|---|---|
| | After 6-day Preservation | After 12-day Preservation | After 18-day Preservation | After 24-day Preservation |
| 4th Ex. | 95.9% | 91.4% | 88.0% | 84.8% |
| 5th Ex. | 91.7% | 84.5% | 77.5% | 74.0% |
| 6th Ex. | 94.1% | 87.1% | 82.0% | 76.9% |
| 3rd Comp. Ex. | 92.5% | 84.1% | 77.7% | 73.3% |
| 4th Comp. Ex. | 92.4% | 84.7% | 75.3% | 71.4% |

Contrasting the third comparative example with the fourth comparative example makes the following turn out: doing the surface modification upgrades the post-24-day preserved capacity. Moreover, contrasting the fourth through sixth examples with the third and fourth comparative examples makes the following turn out: both the surface modification and doping upgrade the post-24-day preserved capacity suitably. In addition, contrasting the fourth through sixth examples with each other makes the following turn out: the concentration of the aqueous solution for surface modification changes the initial capacity and post-preservation capacity maintained rate.

First Reference Example

Aforementioned Treatment 1 was followed to carry out the following treatments to a lithium composite metallic oxide serving as a starting substance.

A lithium composite metallic oxide made by a coprecipitation method and expressed by $LiNi_{1/3}Co_{1/3}Mn_{1/3}O_2$ was readied. Surface-modifying aqueous solutions including $(NH_4)_2HPO_4$ in an amount of 4.0% by mass and $Mg(NO_3)_2$ in an amount of 5.8% by mass when each of the aqueous solutions was taken entirely as 100% by mass were prepared, respectively. The lithium composite metallic oxide was immersed into the surface-modifying aqueous solutions, and was then stirred in the aqueous solutions and mixed therewith at room temperature. The immersion time was set at one hour. A filtration was carried out after the immersion. Subsequently, the surface-modified lithium composite metallic oxide was dried at 130° C. for six hours. Thereafter, the obtained lithium composite metallic oxide was heated at 700° C. under an air atmosphere for five hours. A product obtained by the treatments was labeled an active material according to a first reference example.

A lithium-ion secondary battery according to the first reference example was fabricated in the following manner.

A positive electrode was made as described below.

An aluminum foil with a thickness of 20 μm was readied to serve as a current collector for positive electrode. The following were mixed each other: the active material according to the first reference example in an amount of 94 parts by mass; acetylene black serving as a conductive additive in an amount of three parts by mass; and polyvinylidene fluoride (or PVdF) serving as a binder in an amount of three parts by mass. The mixture was dispersed in a proper amount of N-methyl-2-pyrrolidone (or NMP) to prepare a slurry. The aforementioned slurry was put on a surface of the aforementioned aluminum foil, and then the slurry was coated thereon so as to be in the shape of a film using a doctor blade. The NMP was removed to form an active-material layer on the aluminum-foil surface by means of volatilization by drying the aluminum foil with the slurry coated at 80° C. for 20 minutes. The aluminum foil with the active-material layer formed on the surface was compressed using a roll pressing machine to adhesion join the aluminum foil and the active-material layer firmly with one another. The joined substance was heated at 120° C. for six hours with a vacuum drier, and was then cut out to a predetermined configuration (e.g., a rectangular shape with 25 mm×30 mm) to obtain a positive electrode.

A negative electrode was made as described below.

The following were mixed each other: graphite in an amount of 97 parts by mass; KB serving as a conductive additive in an amount of one part by mass; and styrene-butadiene rubber (or SBR) as well as carboxymethyl cellulose (or CMC) in an amount of one part by mass, respectively, the two serving as a binding agent. The mixture was dispersed in a proper amount of ion-exchanged water to prepare a slurry. The slurry was coated onto a copper foil with a thickness of 20 μm (i.e., a current collector for negative electrode) so as to be in the shape of a film using a doctor blade. The copper foil with the slurry coated thereon was dried, and was thereafter pressed. The joined substance was heated at 120° C. for six hours with a vacuum drier, and was then cut out to a predetermined configuration (e.g., a rectangular shape with 25 mm×30 mm) to make a negative electrode with a thickness of 85 μm approximately.

Using the above-mentioned positive electrode and negative electrode, a laminated-type lithium-ion secondary battery was manufactured. To be concrete, a rectangle-shaped sheet serving as a separator and comprising a polypropylene/polyethylene/polypropylene three-layered-construction resinous film with 27×32 mm in size and 25 μm in thickness was interposed or held between the positive electrode and the negative electrode to make a polar-plate subassembly. After covering the polar-plate subassembly with laminated films in which two pieces made a pair and then sealing the laminated films at the three sides, an electrolytic solution was injected into the laminated films which had been turned into a bag shape. As for the electrolytic solution, a solution was used: the solution comprised a solvent in which ethylene carbonate (or EC), and diethyl carbonate (or DEC) had been mixed one another in such a ratio as EC:DEC=3:7 by volume; and $LiPF_6$ dissolved in the solvent so as to make one mol/L. Thereafter, the remaining one side was sealed to obtain a laminated-type lithium-ion secondary battery in which the four sides were sealed air-tightly and in which the polar-plate subassembly and electrolytic solution were closed hermetically. Note that the positive electrode and negative electrode were equipped with a tab connectable electrically with the outside, respectively, and the tabs extended out partially to the outside of the laminated-type lithium-ion secondary battery.

Via the above steps, the laminated-type lithium-ion secondary battery according to the first reference example was fabricated.

Second Reference Example

Other than varying the time to 36 hours during which the lithium composite metallic oxide was immersed into the surface-modifying aqueous solutions, an active material and laminated-type lithium-ion secondary battery according to a second reference example were fabricated by the same methods as described in the first reference example.

Third Reference Example

Other than varying the respective surface-modifying aqueous solutions to an aqueous solution including $(NH_4)_2HPO_4$ in an amount of 2.1% by mass when the entire aqueous solution was taken as 100% by mass and an aqueous solution including $Mg(NO_3)_2$ in an amount of 3.0% by mass when the entire aqueous solution was taken as 100% by mass, respectively, an active material and laminated-type lithium-ion secondary battery according to a third reference example were fabricated by the same methods as described in the first reference example.

Fourth Reference Example

Other than varying the surface-modifying aqueous solutions to an aqueous solution including $(NH_4)_2HPO_4$ in an amount of 5.4% by mass when the entire aqueous solution was taken as 100% by mass, an active material and laminated-type lithium-ion secondary battery according to a fourth reference example were fabricated by the same methods as described in the first reference example.

First Reference Comparative Example

Other than using as an active material $LiNi_{1/3}Co_{1/3}Mn_{1/3}O_2$ per se (hereinafter, being referred to sometimes as "an untreated product according to a first referential comparative example"), a laminated-type lithium-ion secondary battery according to a first reference comparative example was fabricated by the same method as described in the first reference example.

First Reference Evaluative Example

Initial capacities of the laminated-type lithium-ion secondary batteries according to the first through fourth reference examples and the first reference comparative example were measured. A discharged capacity was measured when carrying out a CC discharging (i.e., constant-current discharging) mode or operation to each of the batteries to be measured at a rate of 0.33 C with a voltage of 3.0 V after carrying out a CCCV charging (i.e., constant-current and constant-voltage charging) mode or operation to each of the batteries at 25° C. at a rate of 0.33 C with a voltage of 4.5 V. The thus measured discharged capacities were labeled the initial capacities.

In addition, each of the batteries to be measured underwent a 4.5-V charging/3.0-V discharging cycle for 25 cycles in which a CCCV charging (i.e., constant-current and constant-voltage charging) mode or operation was carried out to each of the batteries at 55° C. at a rate of 1 C with a voltage of 4.5 V, retaining or leaving each of the batteries alone for 2.5 hours, and thereafter carrying out a CC discharging (i.e., constant-current discharging) mode or operation to each of the batteries at a rate of 0.33 C with a voltage of 3.0 V. Thereafter, discharged capacities at a rate of 0.33 C were measured, and then capacity maintained rates were computed.

The capacity maintained rates (%) were found by the following equation.

Capacity Maintained Rate (%)={(Post-cycle Capacity)/(Initial Capacity)}×100

Note that 1 C refers to a current rate at which a battery is discharged for one hour, for instance.

Table 6 shows results of measuring the Ni, Co and Mn composition ratios in the superficial layer of the active materials, the initial capacities, the post-25-cycle capacities, and the capacity maintained rates.

TABLE 6

| | Superficial-layer Composition Ratio | | | Initial | Post-cycle | Capacity |
|---|---|---|---|---|---|---|
| | Ni (g) | Co (h) | Mn (i) | Capacity (mA·h/g) | Capacity (mA·h/g) | Maintained Rate (%) |
| 1st Reference Ex. | 0.32 | 0.21 | 0.47 | 172.7 | 135.6 | 78.5 |
| 2nd Reference Ex. | 0.28 | 0.10 | 0.62 | 157.5 | 125.0 | 79.4 |
| 3rd Reference Ex. | 0.45 | 0.17 | 0.38 | 160.2 | 116.3 | 72.6 |
| 4th Reference Ex. | 0.31 | 0.25 | 0.44 | 165.8 | 100.5 | 60.6 |
| 1st Reference Comp. Ex. | 0.33 | 0.33 | 0.33 | 177.3 | 85.7 | 48.3 |

The Ni, Co and Mn composition ratios in the superficial layer of the active materials were computed by means of measuring the surface of the active materials by an X-ray photoelectric spectroscopy. The fact that the internal composition ratios of the active materials were not changed was ascertained by analyzing the internal compositions from a particle cross-sectional direction with a TEM-EDX. Moreover, on the occasion, the detected signals of Mg and P used in the surface modification were the detection limits or less of the TEM-EDX analysis at the superficial layer and interior of the active materials. That is, in the superficial layer of an active material being obtainable by a surface modification, saying is possible that not an element added from the outside develops the new performance, but a modification done by elements included therein from the very beginning demonstrates the functional improvements.

When comparing the respective reference examples with the reference comparative example on the Ni, Co and Mn composition ratios in the superficial layer of the active materials, the Mn composition was found out to be high even in any of the reference examples, whereas the Co composition was found out to be low therein on the contrary.

When comparing the first through fourth reference examples with the first reference comparative example on the capacity maintained rates, the capacity maintained rates were found out to be upgraded markedly even in any of the reference examples than in the first reference comparative example.

From the results above, saying is possible that making the Mn composition ratio in the superficial layer of an active material higher than the Mn composition ratio of the original (or in the internal) active material results in turning the active material into an active material exhibiting a favorable capacity maintained rate.

Fifth Reference Example

A lithium composite metallic oxide made by a coprecipitation method and expressed by $LiNi_{5/10}Co_{2/10}Mn_{3/10}O_2$ was readied. Except that the respective surface-modifying aqueous solutions were hereinafter varied to an aqueous solution including $(NH_4)_2HPO_4$ in an amount of 0.4% by mass when the entire aqueous solution was taken as 100% by mass and an aqueous solution including $Mg(NO_3)_2$ in an amount of 1.4% by mass when the entire aqueous solution was taken as 100% by mass, respectively, an active material according to a fifth reference example was obtained using the same method as described in the first reference example.

Using the active material obtained as above, a laminated-type lithium-ion secondary battery according to the fifth reference example was fabricated by the following method.

Other than using the active material according to the fifth reference example as an active material, a positive electrode was made in the same manner as the aforementioned first reference example.

A negative electrode was made as described below.

The following were mixed each other: carbon-coated $SiO_x$ (where $0.3 \leq$ "x" $\leq 1.6$) in an amount of 32 parts by mass; graphite in an amount of 50 parts by mass; acetylene black serving as a conductive additive in an amount of eight parts by mass; and polyamide-imide serving as a binding agent in an amount of 10 parts by mass. The mixture was dispersed in a proper amount of ion-exchanged water to prepare a slurry. The slurry was coated onto a copper foil with a thickness of 20 µm (i.e., a current collector for negative electrode) so as to be in the shape of a film using a doctor blade. The current collector with the slurry coated thereon was dried, and was thereafter pressed. The joined substance was heated at 120° C. for six hours with a vacuum drier, and was then cut out to a predetermined configuration (e.g., a rectangular shape with 25 mm×30 mm) to make a negative electrode with a thickness of 85 µm approximately.

Using the above-mentioned positive electrode and negative electrode, a laminated-type lithium-ion secondary battery was manufactured. To be concrete, a rectangle-shaped sheet serving as a separator and comprising a polypropylene/polyethylene/polypropylene three-layered-construction resinous film with 27×32 mm in size and 25 µm in thickness was interposed or held between the positive electrode and the negative electrode to make a polar-plate subassembly. After covering the polar-plate subassembly with laminated films in which two pieces made a pair and then sealing the laminated films at the three sides, an electrolytic solution was injected into the laminated films which had been turned into a bag shape. As for the electrolytic solution, a solution was used: the solution comprised a solvent in which ethylene carbonate, methyl ethyl carbonate and diethyl carbonate had been mixed each other in such a ratio as 3:3:4 by volume; and $LiPF_6$ dissolved in the solvent so as to make one mol/L. Thereafter, the remaining one side was sealed to obtain a laminated-type lithium-ion secondary battery according to the fifth reference example in which the four sides were sealed air-tightly and in which the polar-plate subassembly and electrolytic solution were closed hermetically. Note that the positive electrode and negative electrode were equipped with a tab connectable electrically with the outside, respectively, and the tabs extended out partially to the outside of the laminated-type lithium-ion secondary battery.

Sixth Reference Example

Except that the respective surface-modifying aqueous solutions were varied to an aqueous solution including $(NH_4)_2HPO_4$ in an amount of 4.0% by mass when the entire aqueous solution was taken as 100% by mass and an aqueous solution including $Mg(NO_3)_2$ in an amount of 14.0% by mass when the entire aqueous solution was taken as 100% by mass, respectively, an active material according to a sixth reference example was obtained using the same method as described in the fifth reference example.

Using the active material obtained as above, a laminated-type lithium-ion secondary battery according to the sixth reference example was fabricated by the same method as described in the fifth reference example.

Seventh Reference Example

Except that the respective surface-modifying aqueous solutions were varied to an aqueous solution including $(NH_4)_2HPO_4$ in an amount of 0.4% by mass when the entire aqueous solution was taken as 100% by mass and an aqueous solution including $Ba(NO_3)_2$ in an amount of 1.4% by mass when the entire aqueous solution was taken as 100% by mass, respectively, an active material according to a seventh reference example was obtained using the same method as described in the fifth reference example.

Using the active material obtained as above, a laminated-type lithium-ion secondary battery according to the seventh reference example was fabricated by the same method as described in the fifth reference example.

Eighth Reference Example

Except that the respective surface-modifying aqueous solutions were varied to an aqueous solution including $(NH_4)_2HPO_4$ in an amount of 0.9% by mass when the entire aqueous solution was taken as 100% by mass and an aqueous solution including $Ba(NO_3)_2$ in an amount of 3.5% by mass when the entire aqueous solution was taken as 100% by mass, respectively, an active material according to an eighth reference example was obtained using the same method as described in the fifth reference example.

Using the active material obtained as above, a laminated-type lithium-ion secondary battery according to the eighth reference example was fabricated by the same method as described in the fifth reference example.

Ninth Reference Example

Except that the respective surface-modifying aqueous solutions were varied to an aqueous solution including $(NH_4)_2HPO_4$ in an amount of 0.9% by mass when the entire aqueous solution was taken as 100% by mass and an aqueous solution including $Sr(NO_3)_2$ in an amount of 3.5% by mass when the entire aqueous solution was taken as 100% by mass, respectively, an active material according to a ninth reference example was obtained using the same method as described in the fifth reference example.

Using the active material obtained as above, a laminated-type lithium-ion secondary battery according to the ninth reference example was fabricated by the same method as described in the fifth reference example.

Tenth Reference Example

Except that the respective surface-modifying aqueous solutions were varied to an aqueous solution including $(NH_4)_2HPO_4$ in an amount of 0.2% by mass when the entire aqueous solution was taken as 100% by mass and an aqueous solution including $Al(NO_3)_3$ in an amount of 0.7% by mass when the entire aqueous solution was taken as 100% by mass, respectively, an active material according to a tenth reference example was obtained using the same method as described in the fifth reference example.

Using the active material obtained as above, a laminated-type lithium-ion secondary battery according to the tenth reference example was fabricated by the same method as described in the fifth reference example.

Eleventh Reference Example

Except that the respective surface-modifying aqueous solutions were varied to an aqueous solution including $(NH_4)_2HPO_4$ in an amount of 0.4% by mass when the entire aqueous solution was taken as 100% by mass and an aqueous solution including $Al(NO_3)_3$ in an amount of 1.4% by mass when the entire aqueous solution was taken as 100% by mass, respectively, an active material according to an eleventh reference example was obtained using the same method as described in the fifth reference example.

Using the active material obtained as above, a laminated-type lithium-ion secondary battery according to the eleventh reference example was fabricated by the same method as described in the fifth reference example.

Second Reference Comparative Example

Other than using as an active material $LiNi_{5/10}Co_{2/10}Mn_{3/10}O_2$ per se (e.g. a commercially available produced (hereinafter, being referred to sometimes as "an untreated product according to a second reference comparative example")), a laminated-type lithium-ion secondary battery according to a second reference comparative example was fabricated by the same method as described in the fifth reference example.

Second Evaluative Example

Initial capacities of the lithium-ion secondary batteries according to the fifth through eleventh reference examples and the second reference comparative example were measured. A discharged capacity was measured when carrying out a CC discharging (i.e., constant-current discharging) mode or operation to each of the batteries to be measured at a rate of 0.33 C with a voltage of 3.0 V after carrying out a CCCV charging (i.e., constant-current and constant-voltage charging) mode or operation to each of the batteries at 25° C. at a rate of 0.33 C with a voltage of 4.5 V. The thus measured discharged capacities were labeled the initial capacities.

In addition, each of the batteries to be measured underwent a charging/discharging cycle for 200 cycles in which each of the batteries was charged and discharged at 60° C. at a rate of 1 C with a voltage falling in a range of from 4.32 V to 3.0 V. Thereafter, discharged capacities were measured under the same conditions as described in the measurement of the initial capacities after leaving each of the batteries at room temperature for five hours or more. The thus measured discharged capacities were labeled post-cycle capacities.

The capacity maintained rates (%) were found by the following equation.

Capacity Maintained Rate (%)={(Post-cycle Capacity)/(Initial Capacity)}×100

Table 7 shows results of measuring the Ni, Co and Mn composition ratios in the superficial layer of the active materials, the initial capacities, the post-200-cycle capacities, and the capacity maintained rates.

TABLE 7

| | Superficial-layer Composition Ratio | | | Initial | Post-cycle | Capacity |
|---|---|---|---|---|---|---|
| | Ni (g) | Co (h) | Mn (i) | Capacity (mA · h/g) | Capacity (mA · h/g) | Maintained Rate (%) |
| 5th Reference Ex. | 0.45 | 0.16 | 0.39 | 141.9 | 111.2 | 78.2 |
| 6th Reference Ex. | 0.34 | 0.11 | 0.55 | 112.3 | 85.9 | 76.8 |
| 7th Reference Ex. | 0.46 | 0.17 | 0.37 | 141.6 | 107.6 | 76.1 |
| 8th Reference Ex. | 0.43 | 0.16 | 0.41 | 138.3 | 106.4 | 76.8 |
| 9th Reference Ex. | 0.45 | 0.17 | 0.39 | 141.3 | 108.6 | 76.9 |
| 10th Reference Ex. | 0.47 | 0.15 | 0.38 | 145.2 | 112.4 | 77.2 |
| 11th Reference Ex. | 0.48 | 0.15 | 0.38 | 144.0 | 109.6 | 76.4 |
| 2nd Reference Comp. Ex. | 0.50 | 0.20 | 0.30 | 146.9 | 111.6 | 76.0 |

The Ni, Co and Mn composition ratios in the superficial layer of the active materials were computed by means of measuring the surface of the active materials by an X-ray photoelectric spectroscopy. Moreover, the following were also ascertained using a TEM-EDX analysis: the internal composition ratios of the active materials were not changed; and the detected signals of Mg, Ba, Sr, Al and P used in the surface modification were the detection limits or less of the TEM-EDX analysis at the superficial layer and interior of the active materials. In the fifth through eleventh reference examples as well, in the superficial layer of an active material being obtainable by a surface modification, saying is possible that not an element added from the outside develops the new performance, but a modification done by elements included therein from the very beginning demonstrates the functional improvements.

When comparing the fifth through eleventh reference examples with the second reference comparative example on the Ni, Co and Mn composition ratios in the superficial layer of the active materials, the Mn composition ratio was found out to be higher even in any of the reference examples than in the second reference comparative example, whereas the Co composition was found out to be low therein on the contrary. And, when comparing the fifth through eleventh reference examples with the second reference comparative example on the capacity maintained rates, the capacity maintained rates were found out to be upgraded more even in any of the reference examples than in the reference comparative example. From the results, saying is possible that making the Mn composition ratio in the superficial layer of an active material higher than the Mn composition ratio of the original (or in the internal) active material results in turning the active material into an active material exhibiting a favorable capacity maintained rate.

Note that, in the secondary battery according to the reference examples, the secondary batteries (like the seventh reference example), in which only slight improvements were observed on the capacity maintained rates, compared with the secondary battery according to the reference second comparative example, at the time after 200 cycles passed, are present. However, in charging/discharging cycles after going beyond 200 cycles, the improvements on the capacity maintained rates are predicted to expand furthermore. And, since practical secondary batteries are expected to maintain satisfiable capacities even in charging/discharging cycles after going beyond 200 cycles, even such an extent of the capacity-maintained-rate improvement observed in the seventh reference example is a beneficial effect.

The results of testing shown in Table 6 and Table 7 do not at all contradict with such characteristics of Mn in an active material as "Mn is the most inactive at the time of Li charging/discharging reactions. Although the greater the Mn content is within an active material the more the capacity declines, the greater the Mn content is within an active material the more the active material excels in the stability contrarily."

Note herein that, for a lithium composite metallic oxide having a lamellar rock-salt structure and expressed by $LiNi_bCo_cMn_dO_2$, the following lattice-energy differences are computed using the first principles calculation under the following conditions: initial lattice-energy differences (or "initial–$\Delta$ H") in the respective compositions of Ni, Co and Mn; and lattice-energy differences (or "Li-Separation–$\Delta$ H") when ⅔ of lithium has separated from the lithium composite metallic oxide. Table 8 shows the results. Note that a "lattice-energy difference (or –$\Delta$ H)" means a difference between an energy of $LiNi_bCo_cMn_dO_2$ with a lamellar rock-salt structure and another energy when lithium is separated and then each of Ni, Co and Mn is oxidized so that the lamellar rock-salt structure has collapsed.

Software: Quantum Espresso (PWscf);
Exchange-correlation Interaction: GGAPBE Functional;
Calculation Method: PAW (i.e., Project Augmented Wave) Method; and
Wave-function Cut-off: 50 Ry

TABLE 8

| Entry | Ni: "b" | Co: "c" | Mn: "d" | Initial - $\Delta$H | Li-separation - $\Delta$H |
|---|---|---|---|---|---|
| Entry 1-1 | 0.56 | 0.11 | 0.33 | 87.41 | 51.49 |
| Entry 1-2 | 0.56 | 0.17 | 0.28 | 86.73 | 50.82 |
| Entry 1-3 | 0.56 | 0.22 | 0.22 | 86.14 | 50.25 |
| Entry 2-1 | 0.50 | 0 | 0.50 | 89.26 | 53.99 |
| Entry 2-2 | 0.50 | 0.11 | 0.39 | 88.34 | 52.75 |
| Entry 2-3 | 0.50 | 0.17 | 0.33 | 87.88 | 52.15 |
| Entry 2-4 | 0.50 | 0.22 | 0.28 | 87.29 | 51.60 |
| Entry 2-5 | 0.50 | 0.28 | 0.22 | 86.70 | 51.03 |

TABLE 8-continued

| Entry | Ni: "b" | Co: "c" | Mn: "d" | Initial - $\Delta$H | Li-separation - $\Delta$H |
|---|---|---|---|---|---|
| Entry 3-1 | 0.44 | 0.11 | 0.44 | 89.21 | 54.06 |
| Entry 3-2 | 0.44 | 0.17 | 0.39 | 88.76 | 53.46 |
| Entry 3-3 | 0.44 | 0.22 | 0.33 | 88.33 | 52.81 |
| Entry 3-4 | 0.44 | 0.28 | 0.28 | 87.73 | 52.25 |
| Entry 3-5 | 0.44 | 0.33 | 0.22 | 87.24 | 51.68 |
| Entry 4-1 | 0.39 | 0.22 | 0.39 | 89.17 | 54.12 |
| Entry 4-2 | 0.39 | 0.28 | 0.33 | 88.75 | 53.48 |
| Entry 4-3 | 0.39 | 0.33 | 0.28 | 88.26 | 52.90 |
| Entry 5-1 | 0.33 | 0.33 | 0.33 | 89.16 | 54.17 |
| Entry 5-2 | 0.33 | 0.44 | 0.22 | 88.19 | 53.01 |

From the results in Entry 1-1 through Entry 1-3, the composition with a high Mn ratio is found out to have a larger value of "Li-separation–$\Delta$ H" than does the composition with a low Mn ratio when the Ni composition is constant. The same is found out from the results in Entry 2-1 through Entry 2-5, Entry 3-1 through Entry 3-5, Entry 4-1 through Entry 4-3, and Entry 5-1 through Entry 5-2. Note herein that, when Ni is constant, a lithium composite metallic oxide with a high Mn composition has been ascertained theoretically to be stable in the lithium composite metallic oxide having a lamellar rock-salt structure and expressed by $LiNi_bCo_cMn_dO_2$, because the larger the value of "Li-separation–$\Delta$ H" is the more stable the lamellar rock-salt structure is.

In consideration of the results of the first principles calculation, the advantageous effect of improving the capacity maintained rates shown by the reference examples owes to the fact that an Mn composition becomes high in the superficial layer of the active materials. That is, saying is possible that the advantageous effect arise as a consequence of the following: a lamellar rock-salt structure in the active-material superficial layer is stabilized more and accordingly the lamellar rock-salt structure of the active materials is maintained suitably even after undergoing the cyclic charging/discharging mode or operation.

Therefore, the results shown by the reference examples are believed to be valid not only for the $LiNi_{1/3}Co_{1/3}Mn_{1/3}O_2$ and $LiNi_{5/10}Co_{2/10}Mn_{3/10}O_2$ used actually but also for each and every material expressed by the general formula: $Li_aNi_bCo_cMn_dD_eO_f$ (where 0.2≤"a"≤1.5, "b"+"c"+"d"+"e"=1, 0≤"e"<1, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and 1.7≤"f"≤2.1).

Next, a suitable high manganese portion is hereinafter investigated. Table 9 shows the relationships between the prior-to-surface-modification and post-surface-modification Ni, Co and Mn compositions based on the results according to the first through eleventh reference examples. Note that the lower parenthesized lines in the columns designated with "Superficial-layer Composition Ratio" show relationships with the prior-to-surface-modification compositions. For example, Ni("g") according to the first reference example means to multiply 0.33, a prior-to-surface-modification composition, by 0.96.

TABLE 9

| | Superficial-layer Composition Ratio | | | Initial Capacity | Capacity Maintained |
| --- | --- | --- | --- | --- | --- |
| | Ni ("g") | Co ("h") | Mn ("i") | (mA · h/g) | Rate (%) |
| 1st Reference Ex. | 0.32 (0.33 × 0.96) | 0.21 (0.33 × 0.63) | 0.47 (0.33 × 1.41) | 172.7 | 78.5 |
| 2nd Reference Ex. | 0.28 (0.33 × 0.84) | 0.10 (0.33 × 0.3) | 0.62 (0.33 × 1.86) | 157.5 | 79.4 |
| 3rd Reference Ex. | 0.45 (0.33 × 1.35) | 0.17 (0.33 × 0.51) | 0.38 (0.33 × 1.14) | 160.2 | 72.6 |
| 4th Reference Ex. | 0.31 (0.33 × 0.93) | 0.25 (0.33 × 0.75) | 0.44 (0.33 × 1.32) | 165.8 | 60.6 |
| 1st Reference Comp. Ex. | 0.33 | 0.33 | 0.33 | 177.3 | 48.3 |
| 5th Reference Ex. | 0.45 (0.5 × 0.9) | 0.16 (0.2 × 0.8) | 0.39 (0.3 × 1.3) | 141.9 | 78.2 |
| 6th Reference Ex. | 0.34 (0.5 × 0.68) | 0.11 (0.2 × 0.55) | 0.55 (0.3 × 1.8) | 112.3 | 76.8 |
| 7th Reference Ex. | 0.46 (0.5 × 0.92) | 0.17 (0.2 × 0.85) | 0.37 (0.3 × 1.23) | 141.6 | 76.1 |
| 8th Reference Ex. | 0.43 (0.5 × 0.86) | 0.16 (0.2 × 0.8) | 0.41 (0.3 × 1.37) | 138.3 | 76.8 |
| 9th Reference Ex. | 0.45 (0.5 × 0.9) | 0.17 (0.2 × 0.85) | 0.39 (0.3 × 1.3) | 141.3 | 76.9 |
| 10th Reference Ex. | 0.47 (0.5 × 0.94) | 0.15 (0.2 × 0.75) | 0.38 (0.3 × 1.27) | 145.2 | 77.2 |
| 11th Reference Ex. | 0.48 (0.5 × 0.96) | 0.15 (0.2 × 0.75) | 0.38 (0.3 × 1.27) | 144.0 | 76.4 |
| 2nd Reference Comp. Ex. | 0.5 | 0.2 | 0.3 | 146.9 | 76.0 |

The prior-to-surface-modification compositions of Ni, Co, and Mn are labeled "b," "c," and "d," respectively.

In Table 9, "g" falls within a range of 0.68×"b"≤"g"≤1.35×"b". Hence, "g" making both of the initial capacity and capacity maintained rate suitable is presumed to fall within a range of 0.88×"b"<"g"≤0.96×"b".

In Table 9, "h" falls within a range of 0.3×"c"≤"h"≤0.85× "c". Hence, "h" making both of the initial capacity and capacity maintained rate suitable is presumed to fall within a range of 0.63×"c"≤"h"≤0.85×"c".

In Table 9, "i" falls within a range of 1.14×"d"≤"i"≤1.86× "d". Hence, "i" making both of the initial capacity and capacity maintained rate suitable is presumed to fall within a range of 1.2×"d"<"i"≤1.41×"d".

Third Reference Evaluative Example

The particles of the active material according to the first reference example and the particles of the untreated product according to the first reference comparative example were provided with a cross section, respectively, by an Ar-ion milling method using an ion slicer (e.g., "EM-09100IS" produced by JEOL Ltd.), and then an analysis on the cross sections was executed by a TEM-EDX. Table 10 lists results of the analysis at sites or locations of which the distance from the active-material superficial layer was 5 nm and 20 nm. Note that the values of Ni, Co and Mn in Table 10 are percentages of the respective metals to the summed amounts of Ni, Co and Mn. Moreover, the values of O therein are percentages of O to the summed amounts of Ni, Co, Mn and O.

TABLE 10

| | | 5 nm | 20 nm |
| --- | --- | --- | --- |
| 1st Reference Ex. | Ni | 32.66% | 31.74% |
| | Co | 24.32% | 35.18% |
| | Mn | 43.02% | 33.08% |
| | O | 62.44% | 51.92% |
| Untreated Product | Ni | 34.14% | 34.50% |
| | Co | 33.64% | 34.23% |
| | Mn | 33.22% | 31.27% |
| | O | 49.71% | 49.59% |

The active material according to the first reference example was supported to have a low Co ratio but a high Mn ratio in the vicinity of the superficial layer. Moreover, the oxygen ratio was supported to be high at around the superficial layer.

Twelfth Reference Example

Aforementioned Treatment 1 was followed to carry out the following treatments to a lithium composite metallic oxide serving as a starting substance.

A lithium composite metallic oxide made by a coprecipitation method and expressed by $LiNi_{1/3}Co_{1/3}Mn_{1/3}O_2$ was readied. Surface-modifying aqueous solutions including $(NH_4)_2HPO_4$ in an amount of 4.0% by mass and $Mg(NO_3)_2$ in an amount of 5.8% by mass when each of the aqueous solutions was taken entirely as 100% mass were prepared, respectively. The lithium composite metallic oxide was immersed into the surface-modifying aqueous solutions, and was then stirred in the aqueous solutions and mixed therewith at room temperature. The immersion time was set at 30 minutes.

A filtration was carried out after the immersion. Subsequently, the surface-modified lithium composite metallic oxide was dried at 130° C. for six hours. Thereafter, the obtained lithium composite metallic oxide was heated at 700° C. under an air atmosphere for five hours. A product obtained by the treatments was labeled an active material according to a twelfth reference example.

A lithium-ion secondary battery according to the twelfth reference example was fabricated in the following manner.

A positive electrode was made as described below.

An aluminum foil with a thickness of 20 μm was readied to serve as a current collector for positive electrode. The following were mixed each other: the active material according to the twelfth reference example in an amount of 94 parts by mass; acetylene black serving as a conductive additive in an amount of three parts by mass; and polyvinylidene fluoride (or PVdF) serving as a binder in an amount of three parts by mass. The mixture was dispersed in a proper amount of N-methyl-2-pyrrolidone (or NMP) to prepare a slurry. The aforementioned slurry was put on a surface of the aforementioned aluminum foil, and then the slurry was coated thereon so as to be in the shape of a film using a doctor blade. The NMP was removed to form an active-material layer on the aluminum-foil surface by means of volatilization by drying the aluminum foil with the slurry coated at 80° C. for 20 minutes. The aluminum foil with the active-material layer formed on the surface was compressed using a roll pressing machine to adhesion join the aluminum foil and the active-material layer firmly with one another. The joined substance was heated at 120° C. for 12 hours or more with a vacuum drier, and was then cut out to a predetermined configuration (e.g., a circular shape with 14 mm in diameter) to obtain a positive electrode.

A negative electrode was made as described below.

The following were mixed each other: graphite in an amount of 97 parts by mass; KB serving as a conductive additive in an amount of one part by mass; and styrene-butadiene rubber (or SBR) as well as carboxymethyl cellulose (or CMC) in an amount of $20/17$ parts by mass and $14/17$ parts by mass, respectively, the two serving as a binding agent. The mixture was dispersed in a proper amount of ion-exchanged water to prepare a slurry. The slurry was coated onto a copper foil with a thickness of 20 μm (i.e., a current collector for negative electrode) so as to be in the shape of a film using a doctor blade. The copper foil with the slurry coated thereon was dried, and was thereafter pressed. The joined substance was heated at 200° C. for two hours with a vacuum drier, and was then cut out to a predetermined configuration (e.g., a circular shape with 14 mm in diameter) to make a negative electrode.

Using the above-mentioned positive electrode and negative electrode, a coin-type lithium-ion secondary battery was manufactured. To be concrete, a rectangle-shaped sheet serving as a separator and comprising a polypropylene/polyethylene/polypropylene three-layered-construction resinous film was interposed or held between the positive electrode and the negative electrode to make a polar-plate subassembly. After putting the polar-plate subassembly in a coin-type case and then injecting an electrolytic solution into the coin-type case, the coin-type case was closed hermetically. As for the electrolytic solution, a solution was used: the solution comprised a solvent in which ethylene carbonate (or EC), and diethyl carbonate (or DEC) had been mixed one another in such a ratio as EC:DEC=3:7 by volume; and $LiPF_6$ dissolved in the solvent so as to make 1 mol/L.

Via the above steps, the coin-type lithium-ion secondary battery according to the twelfth reference example was fabricated.

Thirteenth Reference Example

Aforementioned Treatment 2 was followed to carry out the following treatments to a lithium composite metallic oxide serving as a starting substance.

A lithium composite metallic oxide made by a coprecipitation method and expressed by $LiNi_{1/3}Co_{1/3}Mn_{1/3}O_2$ was readied. A surface-modifying aqueous solution including $(NH_4)_2HPO_4$ in an amount of 37% by mass was prepared. The lithium composite metallic oxide was immersed into the surface-modifying aqueous solution, and was then stirred in the aqueous solution and mixed therewith at room temperature. The immersion time was set at 30 minutes.

A filtration was carried out after the immersion. Subsequently, the surface-modified lithium composite metallic oxide was dried at 13° C. for six hours. Thereafter, the obtained lithium composite metallic oxide was heated at 700° C. under an air atmosphere for five hours. A product obtained by the treatments was labeled an active material according to a thirteenth reference example.

Other than employing the active material according to the thirteenth reference example as an active material, a coin-type lithium-ion secondary battery according to the thirteenth reference example was hereinafter fabricated by the same production method as described in the twelfth reference example.

Third Reference Comparative Example

Other than using $LiNi_{1/3}Co_{1/3}Mn_{1/3}O_2$ per se (e.g., a commercially available product (hereinafter, being referred to sometimes as "an untreated product according to a third reference comparative example")) for an active material, a coin-type lithium-ion secondary battery according to a third reference comparative example was fabricated by the same method as described in the twelfth reference example. Note that the treatment according to the present invention was not done to the commercially available product at all.

Fourth Reference Comparative Example

Other than employing an aqueous solution including $(NH_4)_2HPO_4$ in an amount of 5.4% by mass as a surface-modifying aqueous solution, an active material and coin-type lithium-ion secondary battery according to a fourth reference comparative example were fabricated by the same production method as described in the thirteenth reference example.

Fourth Evaluative Example

To the active material according to the twelfth reference example and untreated product according to the third reference comparative example, a composition analysis was carried out by an SEM-EDX method. As a result, the compositions of both of the active material according to the twelfth reference example and untreated product according to the third reference comparative example were the same with one another virtually. However, in the active material according to the twelfth reference example, peaks derived from impurities such as S, Al and Zr were hardly observed, the peaks observed in the untreated product according to the third reference comparative example.

Fifth Evaluative Example

The lithium-ion secondary batteries according to the twelfth and thirteenth reference examples, and the lithium-ion secondary batteries according to the third and fourth reference comparative examples were evaluated by the same method as described in the first reference evaluative example. However, the charging/discharging cycle was set to be done 50 cycles.

Table 11 shows the results.

TABLE 11

|  | Initial Capacity (mA·h/g) | Post-cycle Capacity (mA·h/g) | Capacity Maintained Rate (%) |
| --- | --- | --- | --- |
| 12th Reference Ex. | 165 | 136 | 82% |
| 13th Reference Ex. | 160 | 105 | 66% |
| 3rd Reference Comp. Ex. | 168 | 78 | 46% |
| 4th Reference Comp. Ex. | 172 | 72 | 42% |

The capacity maintained ratios exhibited by the twelfth and thirteenth reference examples were found out to be excellent remarkably, compared with the capacity maintained rates exhibited by the third and fourth reference comparative examples.

The invention claimed is:

1. A lithium composite metallic oxide expressed by a general formula, $Li_a Ni_b Co_c Mn_d D_e O_f$ where $0.2 \leq "a" \leq 1.5$, $"b"+"c"+"d"+"e"=1$, $0<"e"<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf, and Rf, and $1.7 \leq "f" \leq 2.1$;

the lithium composite metallic oxide comprising:

a high manganese portion, which is made of a metallic oxide including Ni, Co and Mn at least and of which the composition ratio between Ni, Co and Mn is expressed by Ni:Co:Mn=g:h:i where $"g"+"h"+"i"=1$, $0<"g"<1$, $0<"h"<"c"$, and $"d"<"i"<1$, in a superficial layer thereof; and a metallic oxidation portion in an outermost superficial layer of the high manganese portion, the metallic oxidation portion is expressed by a formula $Li_q M_2 O_{3+r}$, where $0<"q"<1$, $0\leq"r"<1$, M is a metal selected from the group consisting of Ni, Co and Mn, and the composition of the metallic oxidation portion is different from the composition of the high manganese portion;

the lithium composite metallic oxide further comprising:

a first-composition portion expressed by a general formula, $Li_{a1} Ni_{b1} Co_{c1} Mn_{d1} D_{e1} O_{f1}$ where $0.2 \leq "a1" \leq 1.5$, $"b1"+"c1"+"d1"+"e1"=1$, $0<"e1"<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7 \leq "f1" \leq 2.1$; and a second-composition portion expressed by a general formula, $Li_{a2} Ni_{b2} Co_{c2} Mn_{d2} D_{e2} O_{f2}$ where $0.2 \leq "a2" \leq 1.5$, $"b2"+"c2"+"d2"+"e2"=1$, $0<"e2"<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7 \leq "f2" \leq 2.1$ where at least any of the following is satisfied: $"c2"<"c1"$; or $"d2">"d1"$.

2. The lithium composite metallic oxide as set forth in claim 1, wherein the metallic oxidation portion includes a crystal.

3. The lithium composite metallic oxide as set forth in claim 1, wherein the second-composition portion satisfies both of the following: $"d2">"d1"$; and $"e2"<"e1"$.

4. A production process for the lithium composite metallic oxide as set forth in claim 1, the production process comprising any of following Treatments 1 through 5 carried out to a material expressed by a general formula, $Li_a Ni_b Co_c Mn_d D_e O_f$ (where $0.2 \leq "a" \leq 1.5$, $"b"+"c"+"d"+"e"=1$, $0<"e"<1$, "D" is at least one element selected from the group consisting of Fe, Cr, Cu, Zn, Ca, Mg, Zr, S, Si, Na, K, Al, Ti, P, Ga, Ge, V, Mo, Nb, W, La, Hf and Rf, and $1.7 \leq "f" \leq 2.1$):

(Treatment 1) comprising the steps of:
  1-1) readying an acidic metallic salt aqueous solution;
  1-2) mixing the acidic metallic salt aqueous solution with the aforementioned material;
  1-3) mixing a liquid obtained at said step 1-2) with an ammonium-phosphate salt aqueous solution; and
  1-4) isolating the lithium composite metallic oxide from another liquid obtained at said step 1-3);

(Treatment 2) comprising the steps of:
  2-1) readying an ammonium-phosphate salt aqueous solution;
  2-2) mixing the ammonium-phosphate salt aqueous solution with the aforementioned material;
  2-3) mixing a liquid obtained at said step 2-2) with an acidic metallic salt aqueous solution; and
  2-4) isolating the lithium composite metallic oxide from another liquid obtained at said step 2-3);

(Treatment 3) comprising the steps of:
  3-1) readying an aqueous solution of an ammonium-phosphate salt, or an aqueous solution of a metallic salt and an ammonium-phosphate salt;
  3-2) mixing the aqueous solution with the aforementioned material; and
  3-3) isolating the lithium composite metallic oxide from a liquid obtained at said step 3-2);

(Treatment 4) comprising the steps of:
  4-1) readying an acidic metallic salt aqueous solution, and an ammonium-phosphate salt aqueous solution, respectively;
  4-2) mixing water with the aforementioned material;
  4-3) mixing a liquid obtained at said step 4-2), said acidic metallic salt aqueous solution, and said ammonium-phosphate salt aqueous solution each other; and
  4-4) isolating the lithium composite metallic oxide from another liquid obtained at said step 4-3); or (Treatment 5) comprising the steps of:
  5-1) readying a metallic phosphate salt aqueous solution, or a metallic polyphosphate salt aqueous solution;

5-2) mixing the aqueous solution with the aforementioned material; and 5-3) isolating the lithium composite metallic oxide from a liquid obtained at said step 5-2).

5. A lithium-ion secondary battery comprising the lithium composite metallic oxide as set forth in claim 1.

* * * * *